(12) United States Patent
Li et al.

(10) Patent No.: US 8,149,485 B2
(45) Date of Patent: Apr. 3, 2012

(54) DYNAMICALLY RECONFIGURABLE HOLOGRAMS WITH ELECTRONICALLY ERASABLE PROGRAMMABLE INTERMEDIATE LAYERS

(75) Inventors: Jingjing Li, Sunnyvale, CA (US); Philip J. Kuekes, Menlo Park, CA (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 456 days.

(21) Appl. No.: 12/317,731

(22) Filed: Dec. 29, 2008

(65) Prior Publication Data
US 2010/0165431 A1 Jul. 1, 2010

(51) Int. Cl.
*G03H 1/08* (2006.01)
*G02B 5/32* (2006.01)
*G02F 1/01* (2006.01)

(52) U.S. Cl. .............. 359/9; 359/21; 359/240; 359/245; 977/762; 977/765

(58) Field of Classification Search .................. 359/240, 359/245, 21, 9; 977/762, 765
See application file for complete search history.

(56) References Cited

U.S. PATENT DOCUMENTS

| 6,962,844 B2 * | 11/2005 | Stasiak | 438/237 |
| 2011/0273755 A1 * | 11/2011 | Wang et al. | 359/11 |
| 2011/0273756 A1 * | 11/2011 | Wang et al. | 359/32 |

OTHER PUBLICATIONS

Seraphin et al., "Franz-Keldysh Effect of the Refractive Index in Semiconductors," Physical Review, vol. 139, No. 2A, Jul. 19, 1965, p. A560-A565.*

* cited by examiner

*Primary Examiner* — Jade R Chwasz

(57) ABSTRACT

Dynamically reconfigurable holograms with electronically erasable programmable intermediate layers are disclosed. An example apparatus includes first nanowires, each of the first nanowires having protuberances along a length thereof. The example apparatus also includes second nanowires arranged approximately perpendicular to the first nanowires, the protuberances of the first nanowires being approximately parallel to corresponding ones of the second nanowires. In addition, a layer is disposed between the first and second nanowires. The layer is to control refractive indices at nanowire intersections at intersecting ones of the first and second nanowires.

20 Claims, 20 Drawing Sheets

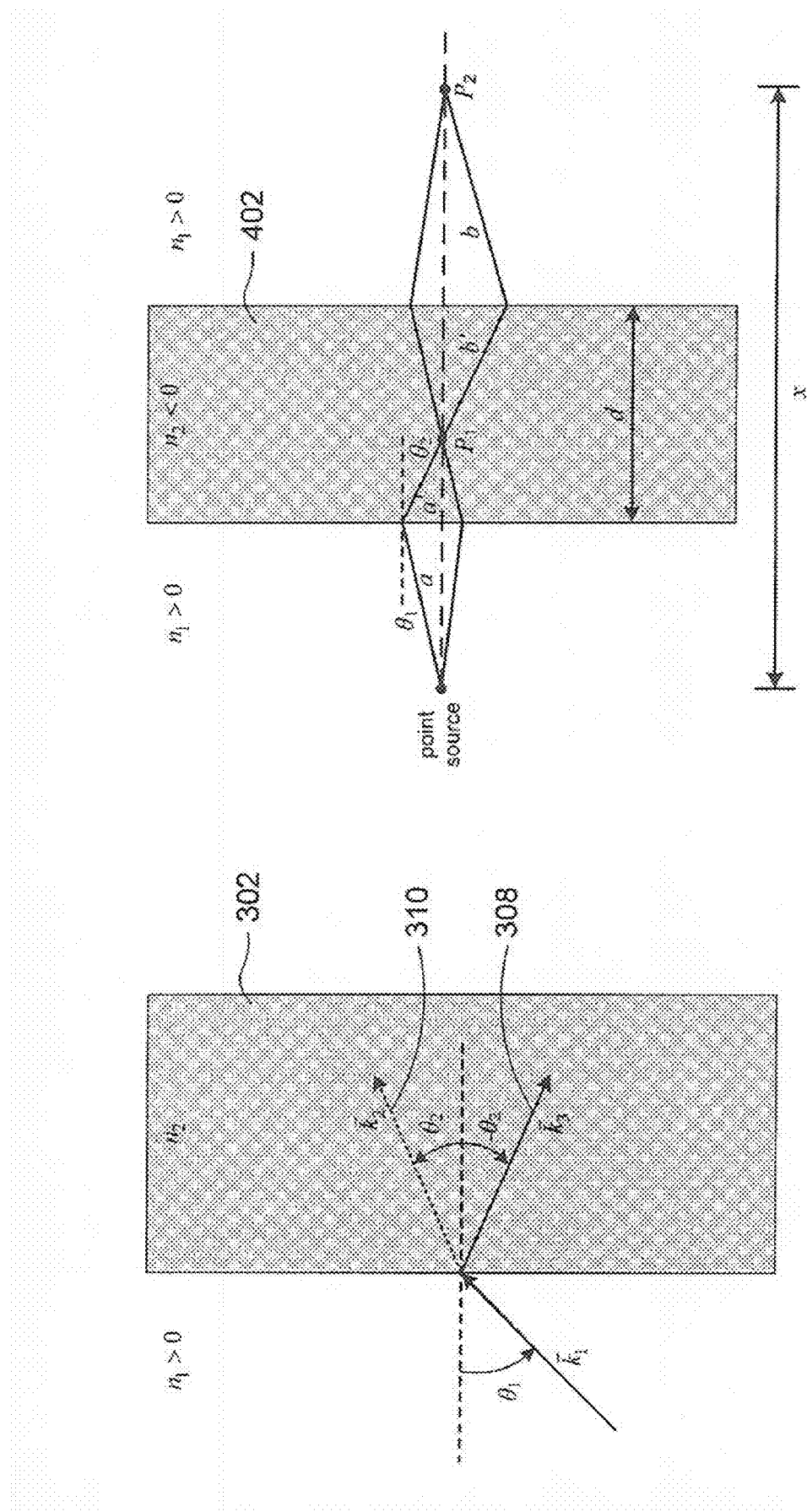

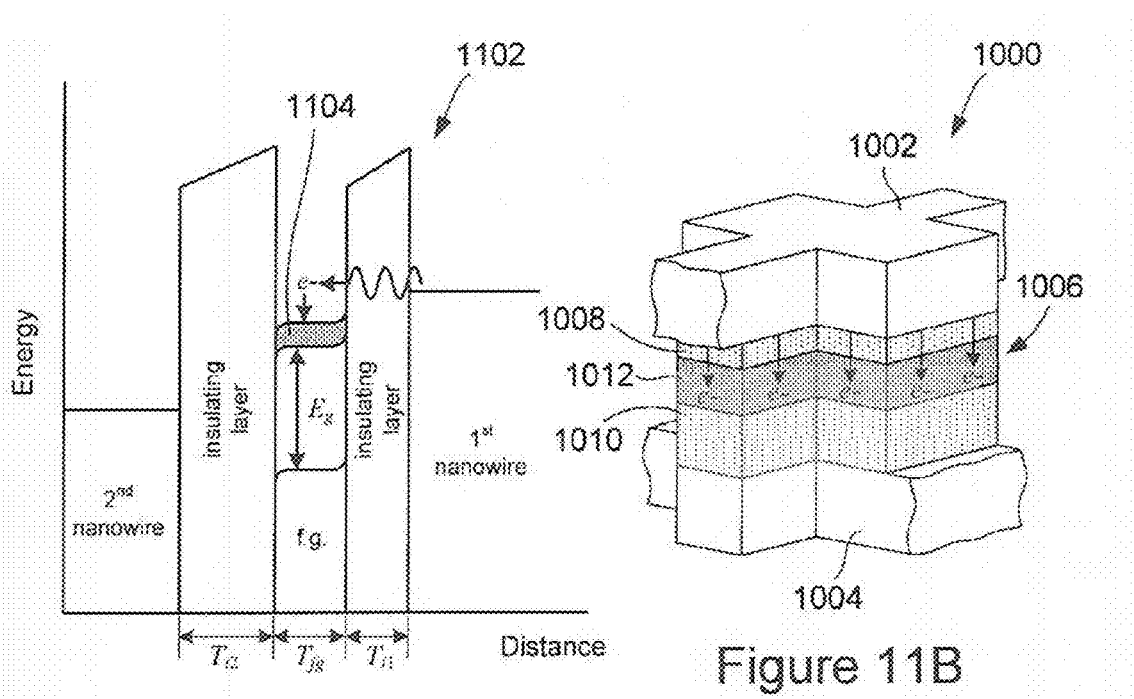
Figure 11A
Figure 11B
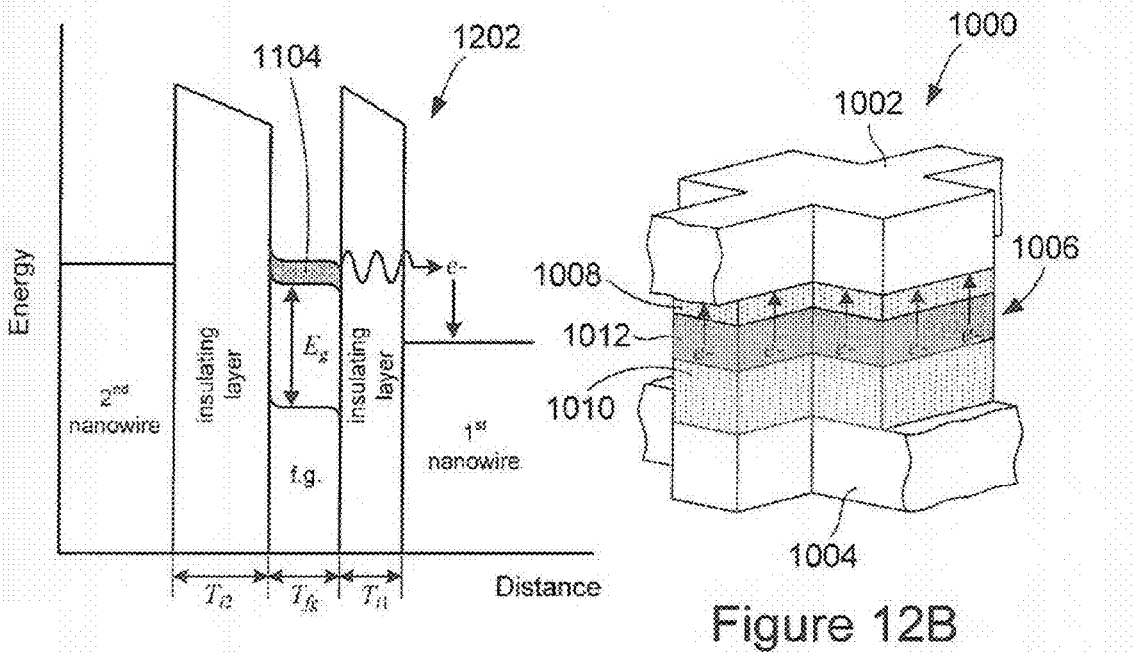
Figure 12A
Figure 12B

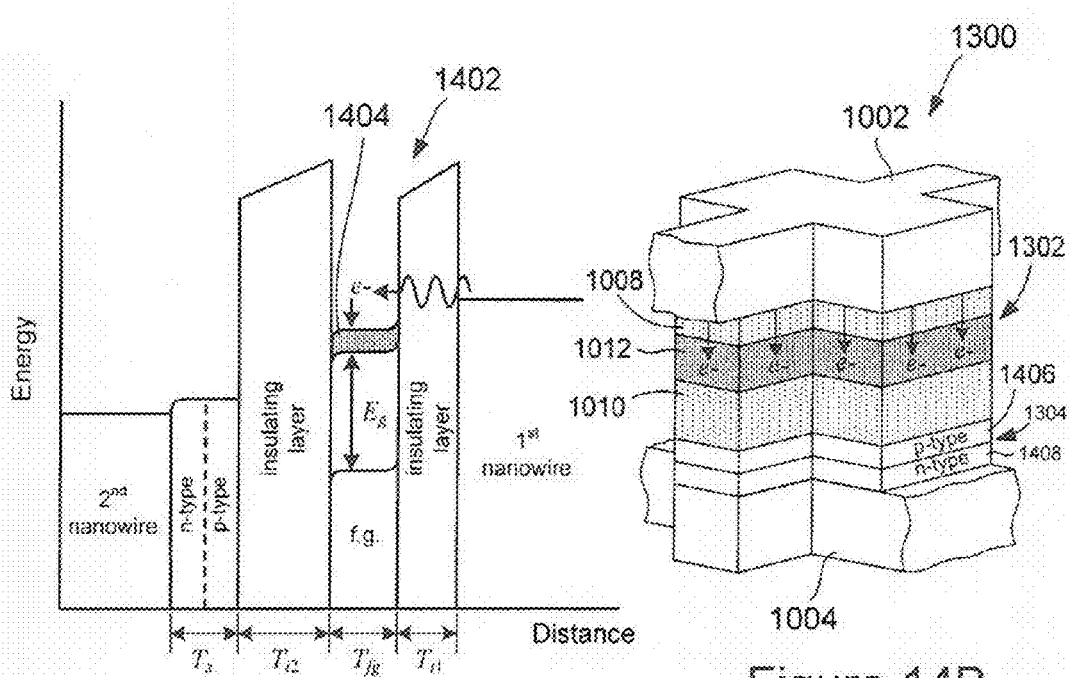
Figure 14A
Figure 14B
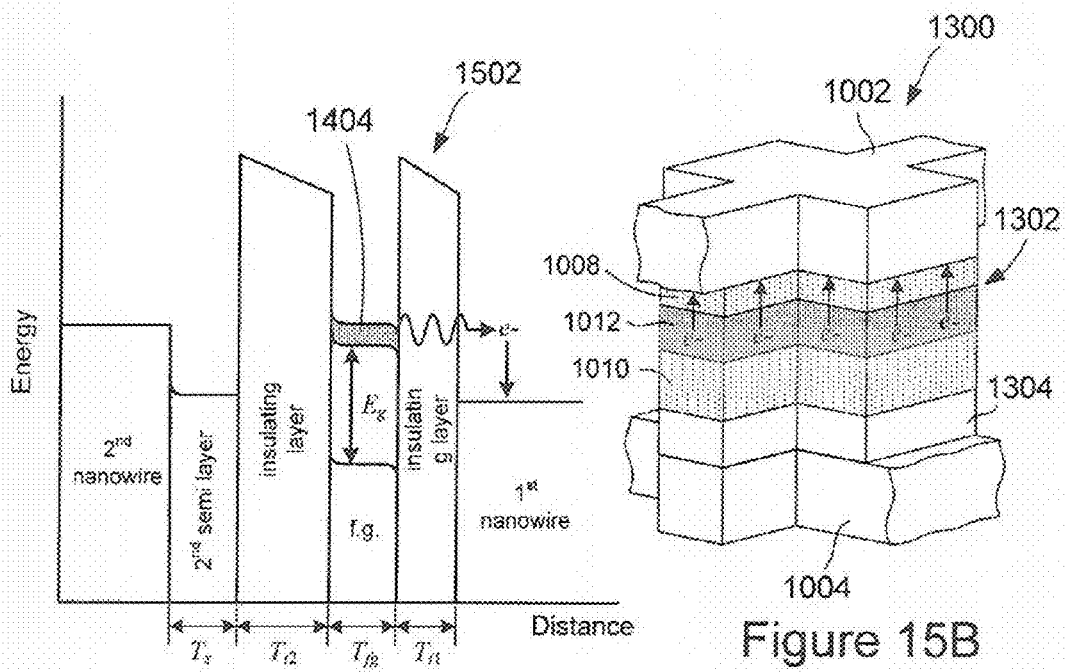
Figure 15A
Figure 15B

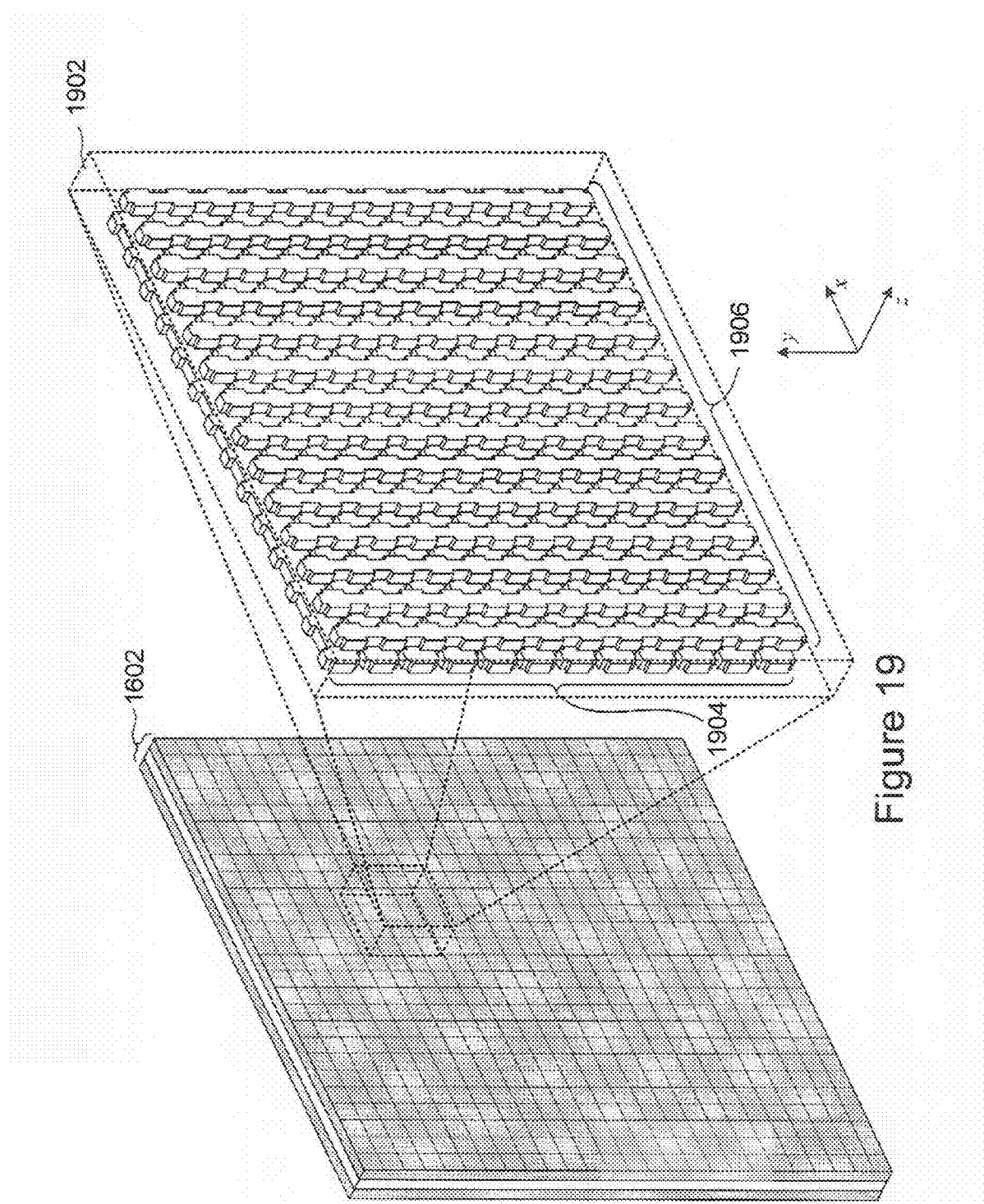

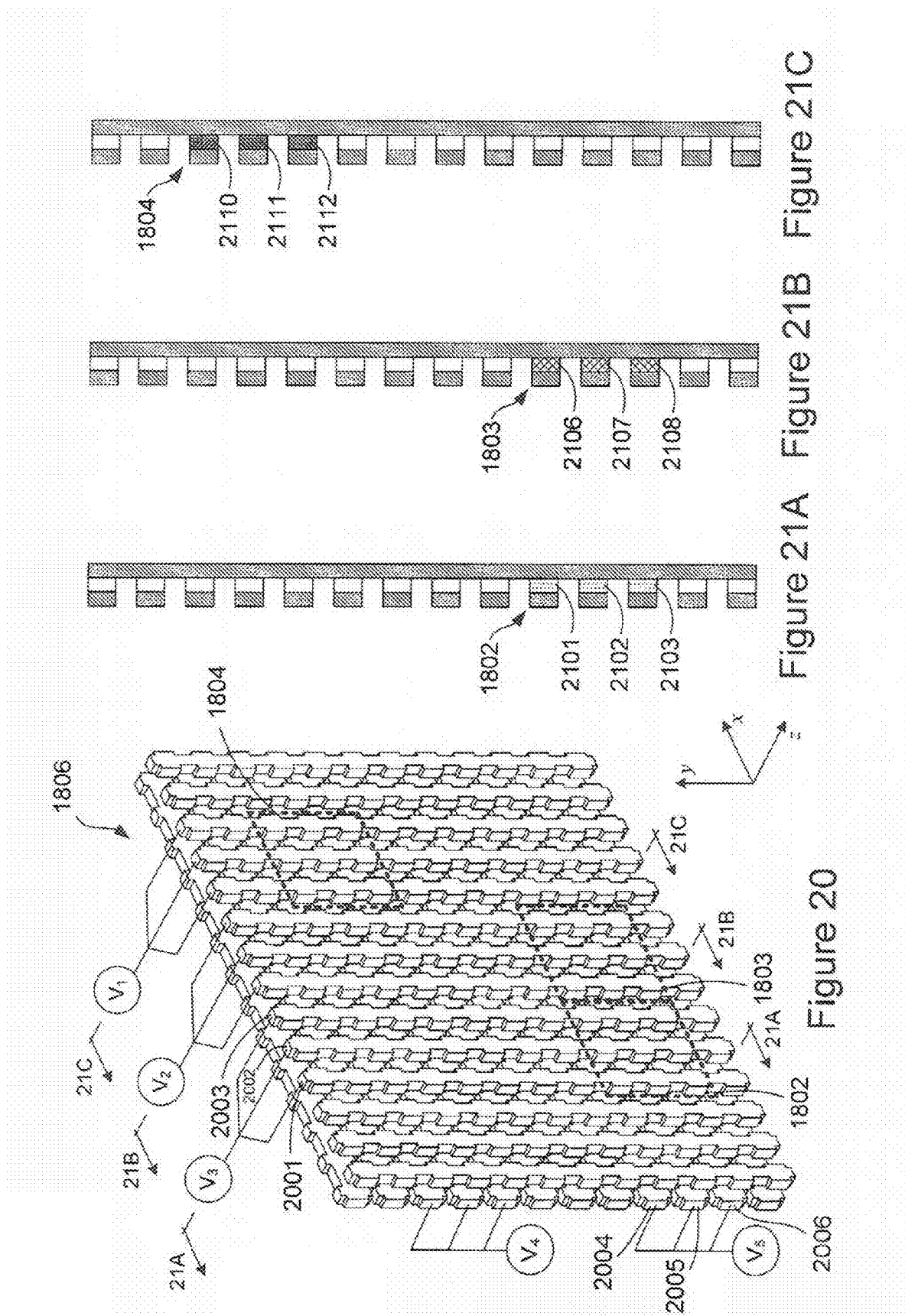

DYNAMICALLY RECONFIGURABLE HOLOGRAMS WITH ELECTRONICALLY ERASABLE PROGRAMMABLE INTERMEDIATE LAYERS

TECHNICAL FIELD

Embodiments of the present invention relate to holograms, and, in particular, to dynamically reconfigurable metamaterial-based holograms for generating three-dimensional images.

BACKGROUND

Photographs compress images of three-dimensional objects into flat, two-dimensional images displayed by a piece of paper, and television and motion pictures also compress images of moving three-dimensional objects into flat, moving, two-dimensional images displayed on a screen. Photographs, television, and motion pictures are examples of media that display three-dimensional objects as simply intensity mappings. In other words, when an image of a scene is ordinarily reproduced in a photograph or motion picture, a viewer does not see an accurate reproduction of the light scattered from the object, but instead a viewer sees a point-by-point record of just the square of the electromagnetic radiation amplitude (i.e., the intensity) reflected from the object. For example, the light reflected off a photograph carries with it information about the intensity of the object displayed by the photograph but nothing about the electromagnetic wavefronts that were once scattered from the object during the taking of the photograph. As a result, a viewer only perceives a two-dimensional image of the object. However, when the electromagnetic wavefronts scattered from an object can be reconstructed for a viewer, the viewer sees wavefronts that are indistinguishable from the wavefronts scattered from the original object. Thus, the viewer is able to see a reformed three-dimensional image of the object, as if the object was actually before the viewer.

Holography is a method of recording and showing a still three-dimensional image of an object using a hologram and monochromatic light from a laser. A conventional hologram is a still record of intensity and wavefronts scattered from an object with respect to an incident reference light that contains point-by-point information for reproducing a three-dimensional holographic image of the object, but is not an image of the object. The hologram is used to reconstruct a three-dimensional holographic image of the object in approximately the same position that the object was in when it was recorded. The holographic image changes as the position and orientation of the viewer changes. Thus the holographic image of an object appears three dimensional to the viewer.

However, a hologram can only be used to produce a single still three-dimensional image of an object. The systems used to generate holograms and holographic images are bulky, and the time and number of steps performed to produce a single hologram make current holographic methods and systems impractical for producing three-dimensional motion pictures of objects. Thus, it is desirable to have holographic methods and compact holographic systems that enable the production of full three-dimensional motion pictures.

BRIEF DESCRIPTION OF THE DRAWINGS

FIG. 3 shows refraction of rays of light in an ordinary right-handed medium and a negative index metamaterial.

FIG. 4 shows focusing properties of a metamaterial slab for light emanating from a point source.

FIGS. 11A-11B show an electronic energy band diagram and electron tunneling associated with electronically programming the refractive index of the first resonant element in accordance with embodiments of the present invention.

FIGS. 12A-12B show an electronic energy band diagram and electron tunneling associated with electronically erasing the refractive index of the first resonant element in accordance with embodiments of the present invention.

FIGS. 14A-14B show an electronic energy band diagram and electron tunneling associated with electronically programming the refractive index of the second resonant element in accordance with embodiments of the present invention.

FIGS. 15A-15B show an electronic energy band diagram and electron tunneling associated with electronically erasing the refractive index of the second resonant element in accordance with embodiments of the present invention.

FIG. 19 shows an isometric view and an enlargement of a region of a phase-control layer in accordance with embodiments of the present invention.

FIG. 20 shows an isometric view and an enlargement of a region of the phase-control layer shown in FIG. 18 in accordance with embodiments of the present invention.

FIGS. 21A-21C show cross-sectional views of three phase-modulation pixels shown in FIG. 20 in accordance with embodiment of the present invention.

DETAILED DESCRIPTION

Various embodiments of the present invention relate to negative refractive index-based systems that can be used as holograms and can be electronically controlled and dynamically reconfigured to generate one or more three-dimensional motion pictures. The systems include a phase-control layer and an intensity-control layer. The phase-control layer is composed of a negative index material crossbar array that enables individual pixels to be electrically addressed and allows for pixelized phase modulation of refracted or reflected electromagnetic radiation. As a result, the phase-control and intensity-control layers produce phase and intensity changes in refracted or reflected light that can be dynamically controlled pixel-by-pixel in order to dynamically display one or more three-dimensional images.

Negative Index Materials

Negative index materials ("NIMs"), also called metamaterials are materials with optical properties resulting from the structure of the material rather than from chemical composition of the material. Natural materials have positive permeability, $\mu$, and may have positive or negative dielectric permittivity $\in$, depending on the type of conductivity of the material and frequency ranges. In contrast, NIMs have simultaneously negative $\in$ and $\mu$, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, consider Maxwell's first-order differential equations for an electromagnetic wave propagating in an ordinary composite material with a time harmonic field as follows:

$$\nabla \times \vec{E} = -j\omega\mu\vec{H}$$

$$\nabla \times \vec{H} = j\omega\in\vec{E}$$

where $\vec{E}$ is the electric field component, $\vec{H}$ is the magnetic field component, $j=\sqrt{-1}$, and $\omega$ is the angular frequency. The solutions of these equations are the plane-wave fields:

$$\vec{E} = \vec{E}_0 \exp(-j\vec{k}_o \cdot \vec{r})$$

$$\vec{H} = \vec{H}_0 \exp(-j\vec{k}_o \cdot \vec{r})$$

Figure 1A:
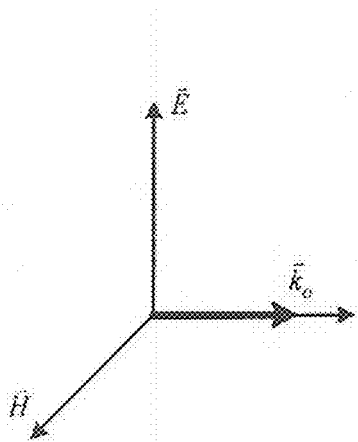
FIGS. 1A-1B show wave and Poynting vector directions for electromagnetic waves propagating in an ordinary right-handed medium.
Figure 1B:
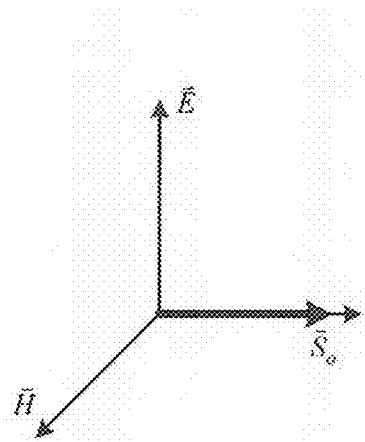

Substituting the plane-wave equations into Maxwell's first order differential equations gives the relations:

$$\vec{k}_o \times \vec{E} = \omega\mu\vec{H}$$

$$\vec{k}_o \times \vec{H} = -\omega\in\vec{E}$$

where $\vec{k}_o$ is a wavevector indicating the direction an electromagnetic wave propagates within a composite material. FIG. 1A shows the spatial relationship and relative orientation of the vectors $\vec{E}$, $\vec{H}$, and $\vec{k}_o$ and reveals that for an ordinary composite material with positive $\in$ and $\mu$, the vectors $\vec{E}$, $\vec{H}$, and $\vec{k}_o$ form an orthogonal, right-handed system of vectors. In addition, the direction of the time-averaged energy flux of the electromagnetic wave is given by the real component of the Poynting vector:

$$\vec{S}_o = \frac{1}{2}\text{Re}(\vec{E} \times \vec{H}^*)$$

which, as shown in FIG. 1B, reveals that the vectors $\vec{E}$, $\vec{H}$, and $\vec{S}_o$ also form an orthogonal, right-handed vector system. In other words, FIGS. 1A and 1B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

Figure 2A:
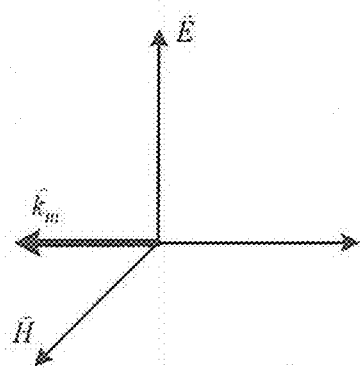
FIGS. 2A-2B show wave and Poynting vector directions for electromagnetic waves propagating in a negative index metamaterial.
Figure 2B:
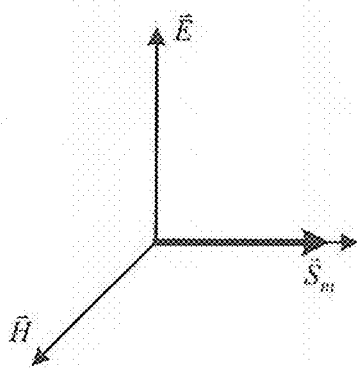

On the other hand, consider NIMs, where $\in<0$ and $\mu<0$. Maxwell's first order differential equations give the relations:

$$\vec{k}_m \times \vec{E} = -\omega|\mu|\vec{H}$$

$$\vec{k}_m \times \vec{H} = \omega|\in|\vec{E}$$

where $\vec{k}_m$ is a wavevector indicating the direction the phase of the electromagnetic wave propagates in a NIM. As shown in FIG. 2A, and in contrast to the composite materials shown in FIG. 1A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 1A and 2A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 2B, the Poynting vector $\vec{S}_m$ in a metamaterial is unaffected by the change of sign of $\in$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1 > 0$, from Snell's law is follows that $n_2 < 0$. That is, the sign of the square root in the definition of the refractive index is chosen to be negative:

$$n_2 = -\sqrt{\varepsilon\mu} < 0$$

Hence the term "negative index material" is used to refer to materials having both negative $\varepsilon$ and $\mu$.

FIG. 3 shows refraction of rays of light in an ordinary right-handed medium and a negative index metamaterial. Dashed line 304 represents a surface normal extending perpendicular to the surface of a medium 302. As shown in FIG. 3, angle $\theta_1$ and wavevector $\vec{k}_1$ 306 represent the angle-of-incidence and direction of a ray of light propagating through an ordinary medium with index of refraction $n_1 > 0$ and is incident on the medium 302. Angle $-\theta_2$ and wavevector $\vec{k}_3$ 308 represent the angle-of-refraction and direction of a refracted ray of light propagating within the medium 302 with refractive index $n_2 < 0$, while angle $\theta_2$ and wavevector $\vec{k}_2$ 310 represent the angle-of-refraction and direction of a refracted ray of light propagating within the medium 302 with refractive index $n_2 > 0$, where $|n_2| > n_1$. Thus, for the medium 302 with a refractive index of $n_2 < 0$, the incident ray 306 and the refracted ray 308 lie on the same side of the surface normal 304, and for the medium 302 with a refractive index of $n_2 > 0$, the incident ray 306 and the refracted ray 310 lie on opposite sides of the surface normal 304.

Tracing the paths of optical rays through conventional concave and convex lens made of left-handed media reveals that concave lenses become convergent and convex lens become divergent, thus reversing the behavior of lenses comprising ordinary media. FIG. 4 shows focusing properties of a slab 402 composed of a NIM for light emanating from a point source. For incident rays paraxial to an optical axis 404, Snell's law gives:

$$|n| = \frac{|n_2|}{n_1} = \frac{|\sin\theta_1|}{|\sin\theta_2|} \cdot \frac{|\tan\theta_1|}{|\tan\theta_2|} = \frac{a'}{a} = \frac{b'}{b}$$

where n is the refractive index $n_2$ of the slab 402 relative to refractive index of the surrounding medium $n_1$. As shown in FIG. 4, rays emanating from the point source are focused at two points $P_1$ and $P_2$. Point $P_1$ lies inside the slab 402 and point $P_2$ lies on the side of the slab 402 opposite the point source. The distance from the point source to the second focusing point $P_2$ is given by:

$$x = a + a' + b' + b = d + \frac{d}{|n|}$$

where d is the width of the slab. When n equals $-1$, the focusing effect is not restricted to paraxial rays, because in this case $|\theta_1|$ equals $|\theta_2|$ for any angle-of-incidence. In fact, when n equals $-1$, all rays emanating from the point source are focused at two points, the latter point $P_2$ being at a distance $2d$ from the point source. Thus, unlike slabs comprising ordinary composite materials, slabs composed of NIMs can be configured to focus light.

Negative Index Material Crossbars

Figure 5:
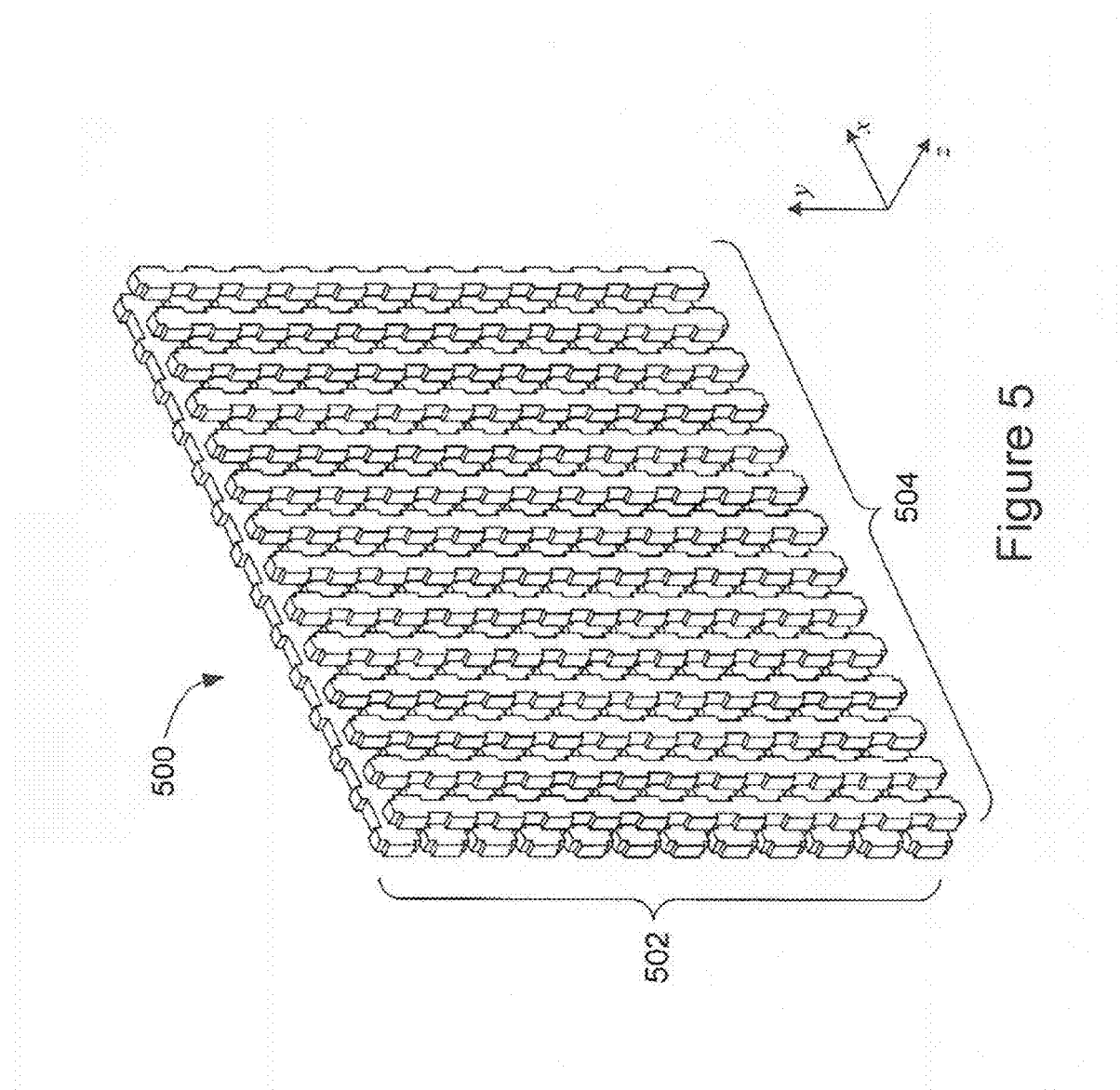
FIG. 5 shows an isometric view of a negative index material crossbar configured in accordance with embodiments of the present invention.

FIG. 5 shows an isometric view of a NIM crossbar 500 configured in accordance with embodiments of the present invention. The NIM crossbar 500 comprises a first layer of approximately parallel nanowires 502 that are overlain by a second layer of approximately parallel nanowires 504. The nanowires of the first layer 502 run substantially parallel to the x-axis and are approximately perpendicular, in orientation, to the nanowires of the second layer 504, which run substantially parallel to the y-axis, although the orientation angle between the nanowires of the layers 502 and 504 may vary. The two layers of nanowires form a lattice, or crossbar, with each nanowire of the second layer 504 overlying all of the nanowires of the first layer 502 and coming into close contact with each nanowire of the first layer 502 at nanowire intersections called "resonant elements" that represent the closest contact between two nanowires.

Figure 6:
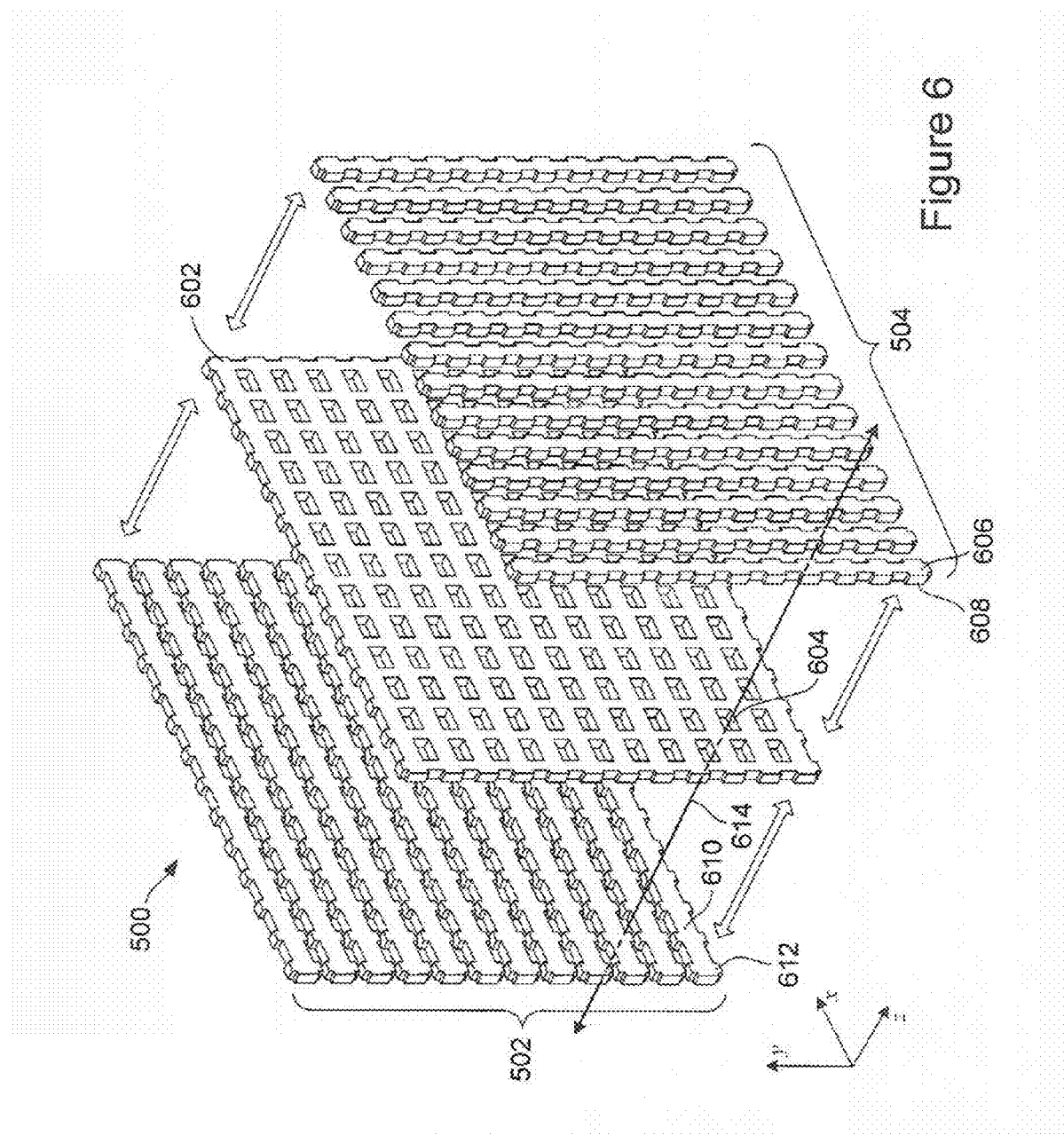
FIG. 6 shows an exploded isometric view of the negative index material crossbar configured in accordance with embodiments of the present invention.

FIG. 6 shows an exploded isometric view of the NIM crossbar 500 configured in accordance with embodiments of the present invention. FIG. 6 reveals an intermediate layer 602 sandwiched between the first layer of nanowires 502 and the second layer of nanowires 504. The intermediate layer 602 is a continuous layer including an array of regularly spaced holes, such as hole 604. In certain embodiments, as shown in FIG. 6, the holes can be rectangular, and in other embodiments, the holes can be square. The nanowires in the first layer 502 have relatively larger cross-sectional dimensions than the nanowires comprising the second layer 504. FIG. 6 also reveals that the nanowires in both the first and second layers 502 and 504 are configured with substantially regularly spaced protuberances called "fingers" that are separated by notches. For example, nanowire 606 includes a finger 608 and nanowire 610 includes a finger 612. The fingers of nanowires of one layer are approximately parallel to the direction of the nanowires in the other layer. The fingers of adjacent nanowires are also substantially aligned within the first and second layers 502 and 504, and the holes in the intermediate layer 602 are substantially aligned with the notches between fingers in the first and second layers 502 and 504. For example, line 614 passes through notches in the first layer 502, passes through the hole 604 in the intermediate layer 602, and passes through notches in the second layer 504.

Figure 7:
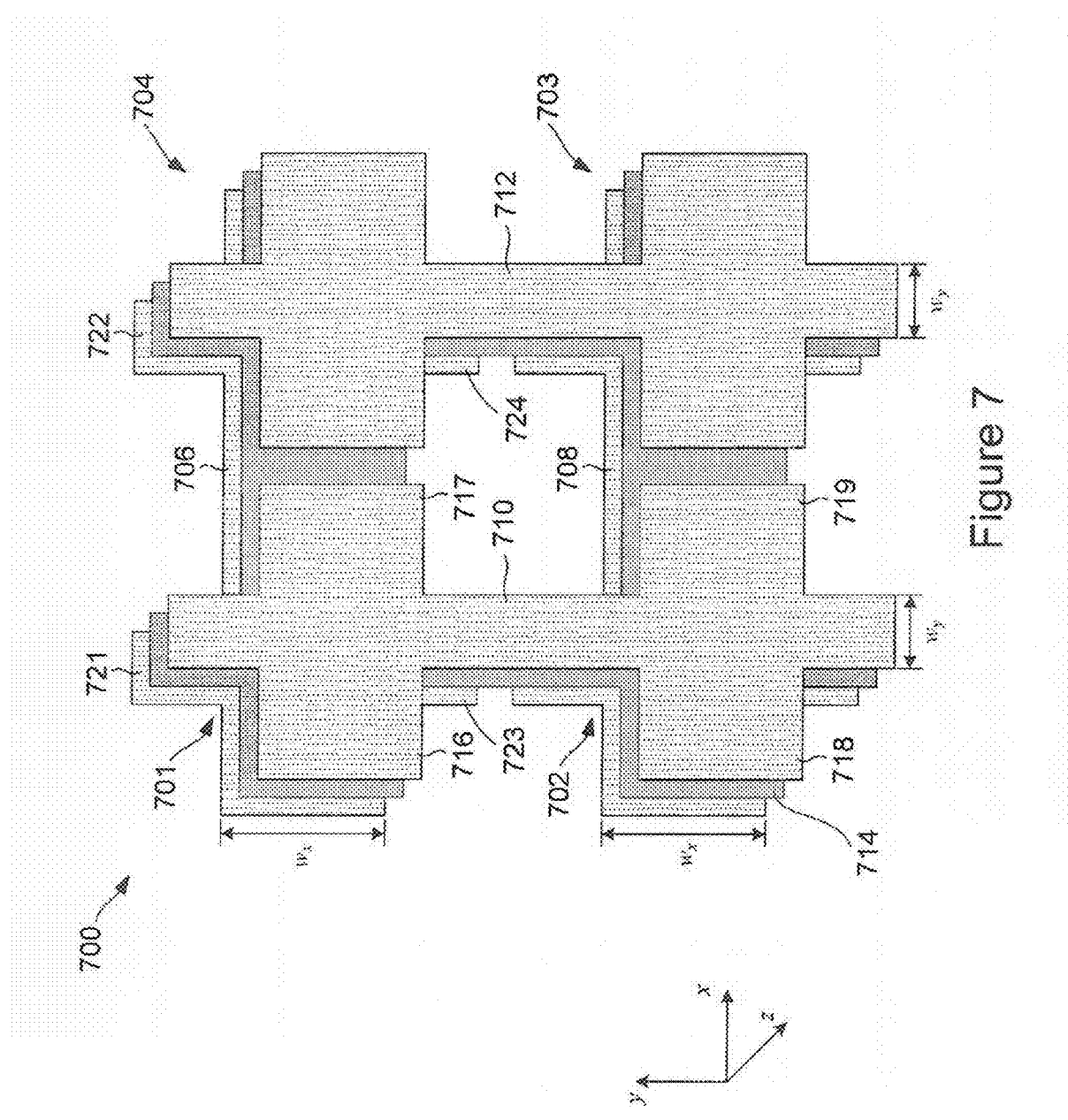
FIG. 7 shows an isometric view of an enlargement of a four adjacent resonant elements of the negative index material crossbar configured in accordance with embodiments of the present invention.

FIG. 7 shows an isometric view of an enlargement 700 of a four adjacent resonant elements 701-704 of the NIM crossbar 500 configured in accordance with embodiments of the present invention. The resonant elements 701-704 are formed where nanowires 710 and 712 extending in the x-direction overlay portions of nanowires 706 and 708 extending in the y-direction. The nanowires 706 and 708 are separated from the nanowires 710 and 712 by an intermediate layer 714. The width $w_x$ of the nanowires 706 and 708 in the first layer 502 is larger than the width $w_y$ of the nanowires 710 and 712 in the second layer 504. The nanowires 710 and 712 include fingers protruding in the x-direction, such as fingers 716-719 of nanowire 710, and nanowires 706 and 708 include fingers protruding in the y-direction, such as fingers 721-724 of nanowire 708. The fingers of adjacent nanowires lying in the same layer are separated by gaps. As shown in FIG. 7, each of the resonant elements 701-704 includes a portion of the intermediate layer sandwiched between two fingers of a nanowire in the first layer 502 and two fingers of a nanowire in the second layer 504. For example, resonant element 701 includes fingers 716 and 717 of nanowire 710 and fingers 721 and 723 of nanowire 706 and a portion of the intermediate layer 714 sandwiched there between.

Figure 8:
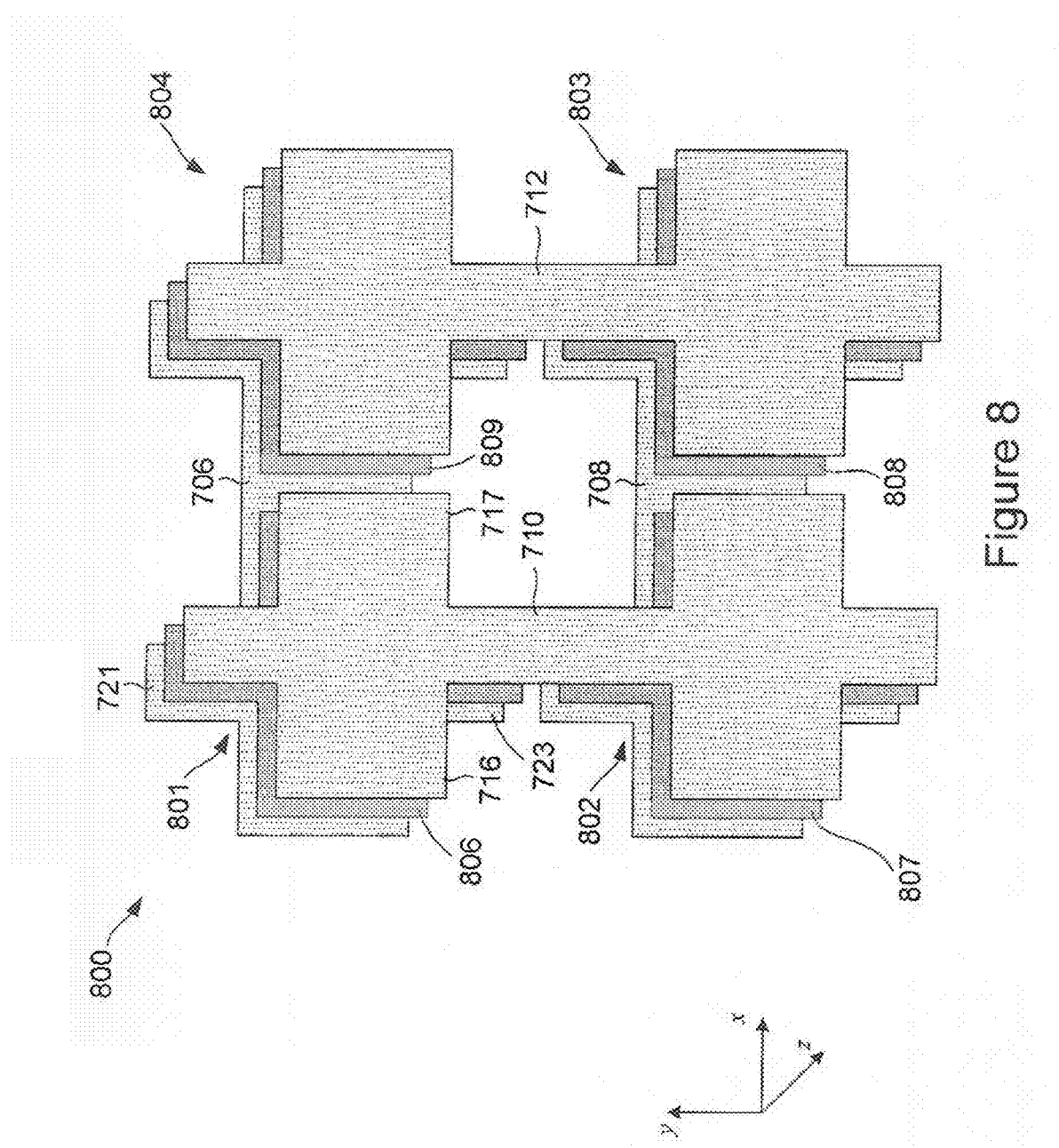
FIG. 8 shows an isometric view of an enlargement of four adjacent resonant elements of a negative index material crossbar configured in accordance with embodiments of the present invention.

In other embodiments, the intermediate layer 602 may be composed of discrete portions of a material lying within each resonant element. FIG. 8 shows an isometric view of an enlargement 800 of four adjacent resonant elements 801-804 of a NIM crossbar configured in accordance with embodiments of the present invention. The resonant elements 801-804 include intermediate plus-shaped layers 806-809, respectively, sandwiched between the nanowires 710 and 712 overlaying nanowires 706 and 708. As shown in FIG. 8, adjacent plus-shaped layers 806-809 are separated by gaps, and each plus-shaped layer fills the space between the nanowire of one layer and the fingers of a nanowire in another layer. For example, plus-shaped layer 806 is configured to fill the space between fingers 721 and 723 and nanowire 710 and fill the space between fingers 716 and 717 and nanowire 706.

Embodiments of the present invention are not limited to the rectangular configurations for the fingers of the nanowires, as shown in FIGS. 5-8. In other embodiments, the fingers can be elliptical, circular, square, irregularly shaped, or have more complex shapes, dictated by design of supporting a magneto-plasmon resonance and related NIM behavior over a particular frequency range. Although the fingers shown in FIGS. 5-8 have clearly defined edges, in practice, the fingers may have rounded edges.

Although individual nanowires shown in FIGS. 5-8 have rectangular cross sections, nanowires can also have square, circular, elliptical, or more complex cross sections. The nanowires may be configured to have many different widths or diameters and aspect ratios or eccentricities ranging from approximately ⅕ to approximately ¹⁄₂₀ of the wavelength of incident light or ranging from approximately 20 nm to approximately 200 nm. The term "nanowire crossbar" may refer to crossbars having one or more layers of sub-microscale wires, microscale wires, or wires with larger cross-sectional dimensions, in addition to nanowires. The nanowires can be composed of silver ("Ag"), gold ("Au"), copper ("Cu"), aluminum ("Al"), platinum ("Pt"), or another suitable electronically conducting metal, or the nanowires can be composed of heavily doped semiconductors depending on the frequency of incident light.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIGS. 5-8, can be manufactured by any of numerous relatively straightforward processes. Many different types of conductive and semi-conductive nanowires can be chemically synthesized from metallic and semiconductor substances, from combinations of these types of substances, and from other types of substances. The individual nanowires of a nanowire crossbar may be connected to microscale address-wire leads or other electronic leads, through a variety of different methods in order to electronically couple the nanowires to electronic devices.

The resonant elements can be configured with dimensions that are smaller than the wavelength λ of light incident on the crossbar 500 enabling the crossbar 500 to be selectively operated as a NIM over particular wavelength ranges. In particular, the size and shape of the fingers can be selected to have an appropriate inductance, resistance, and capacitance response to the wavelengths of incident light on the crossbar. In addition, because each resonant element can be separately addressed by biasing the pair of nanowires crossing at the selected resonant element, the refractive index of the intermediate layer of each resonant element can be adjusted by applying appropriate voltages to the nanowires. The size and shape of the fingers and control over the refractive index of the intermediate layer of the resonant elements enables the crossbar 500 to be configured and operated as a NIM over particular wavelength ranges and shift the transmission phase of light transmitted through the crossbar 500.

Figure 9:
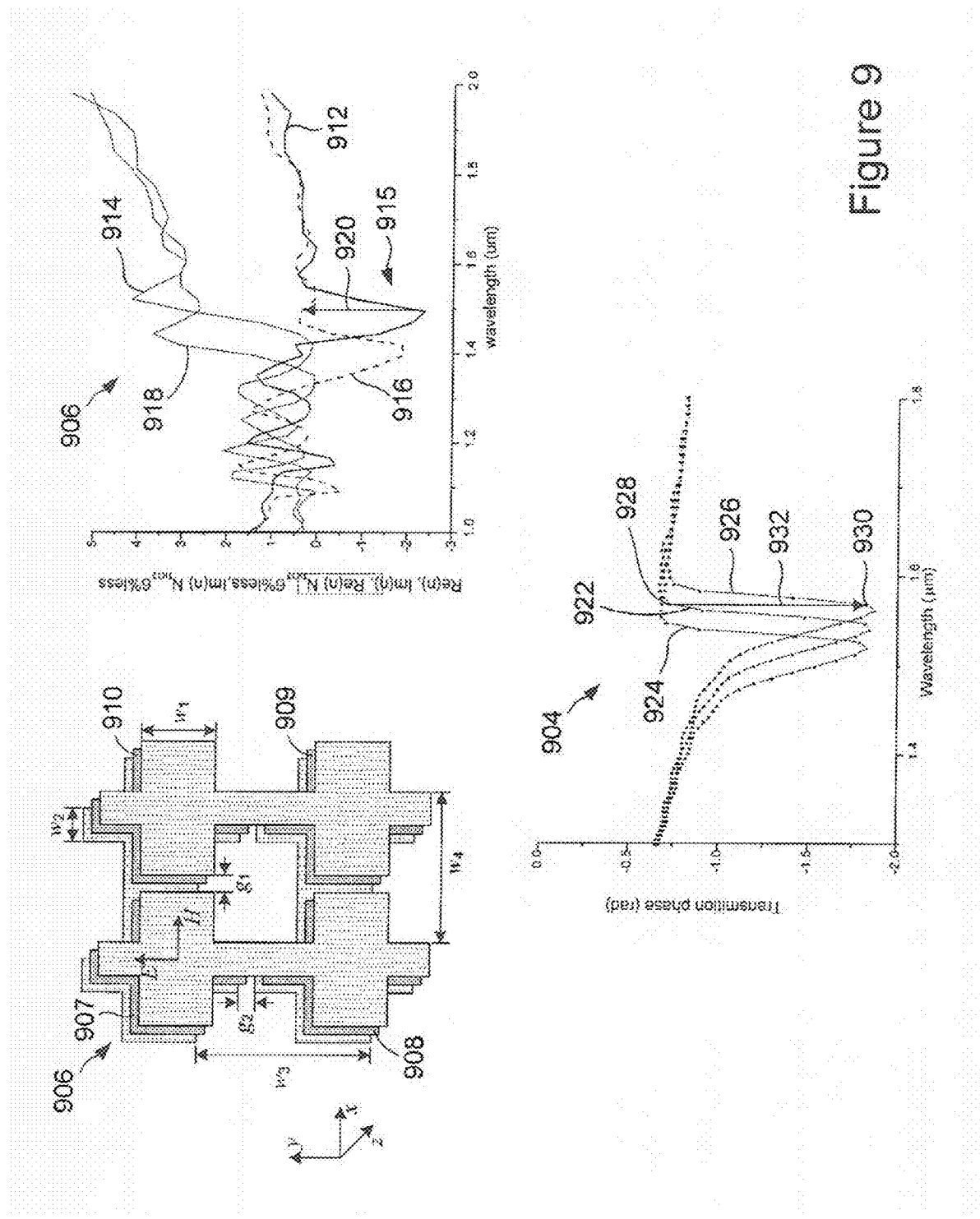
FIG. 9 shows a plot of the refractive index and phase changes for an exemplary negative index material crossbar configured and operated in accordance with embodiments of the present invention.

FIG. 9 shows a plot of the refractive index 902 and phase changes 904 for an exemplary NIM crossbar configured and operated in accordance with embodiments of the present invention. Plots 902 and 904 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 9 also includes a crossbar 906 representing four adjacent resonant elements with parameters identifying the dimensions of the nanowires, fingers, and spacing between resonant elements used to obtain the results displayed in plots 902 and 904. The dimensions of the parameters identified in the crossbar 906 are provided in Table I as follows:

TABLE I

| Parameter | Dimension |
| --- | --- |
| $w_1$ | 225 nm |
| $w_2$ | 90 nm |
| $w_3$ | 450 nm |
| $w_4$ | 450 nm |
| $g_1$ | 45 nm |
| $g_2$ | 45 nm |

The nanowires are composed of Ag, and the plus-shaped intermediate layers 907-910 are composed of $TiO_2$ with a thickness of 60 nm.

For light polarized in the y-direction and incident on the crossbar 906 in the z-direction, curves 912 and 914 of plot 902 represent the real and imaginary refractive index components, respectively, over a range of wavelengths when no voltage is applied to the resonant elements of the crossbar 906. A portion 915 of the real component 912 indicates that the crossbar 906 exhibits a negative refractive index for incident light with wavelengths ranging from approximately 1.42 μm to approximately 1.55 μm with the largest negative refractive index occurring for incident light with wavelengths of approximately 1.5 μm. Curves 916 and 918 of plot 902 represent the real and imaginary refractive index components with a 6% change in the refractive index when appropriate voltages are applied to the nanowires of the crossbar 906. Curve 916 exhibits a real negative refractive index shift for incident light with wavelengths ranging from approximately 1.32 μm to approximately 1.46 μm with the largest negative refractive index occurring for incident light with wavelengths of approximately 1.4 μm. In other words, the refractive index of the resonant elements of the crossbar 906 can be changed so that incident light over particular wavelength ranges encounters a different refractive index. For example, incident light with a wavelength of approximately 1.5 μm encounters the strongest real negative refractive index component when no voltage is applied to the crossbar 906. However, when appropriate voltages are applied to the nanowires, the refractive index encountered by the incident light is shifted to a positive value as indicated by directional arrow 920.

A change in the refractive index encountered by incident light shifts the transmission phase of light transmitted through the crossbar. Curves 922-924 of plot 904 represent the transmission phase of light over a range of wavelengths passing through the crossbar 906 for three different refractive indices. The transmission phase is the phase acquired by light transmitted through the crossbar 906. For example, point 928 indicates that incident light with a wavelength of approximately 1.58 μm transmitted through the crossbar 906 acquires a transmission phase of approximately −0.7 radians. Curve 922 represents the transmission phase acquired by light over a range of wavelengths transmitted through the crossbar 906 when no voltage is applied to the crossbar 906. Curve 924 represents the transmission phase acquired by light over a range of wavelengths transmitted through the crossbar 906 when voltages applied to the nanowires of the crossbar 906 increase the refractive index of the intermediate layers 907-910 by 3%. And curve 926 represents the transmission phase acquired by light over a range of wavelengths transmitted through the crossbar 906 when voltages applied to the nanowires of the crossbar 906 decrease the refractive index of the intermediate layers 907-910 by 3%. The crossbar 906 can be operated to shift the phase acquired by transmitted light. For example, when voltages corresponding to the curve 926 are applied to the crossbar 906, the incident light with wavelengths of approximately 1.58 μm acquire a transmission phase of approximately −1.78 radians, which is a transmission phase shift of approximately −1.2 radians from the point 928 to the point 930, as indicated by directional arrow 932.

Resonant Elements

Figure 10:
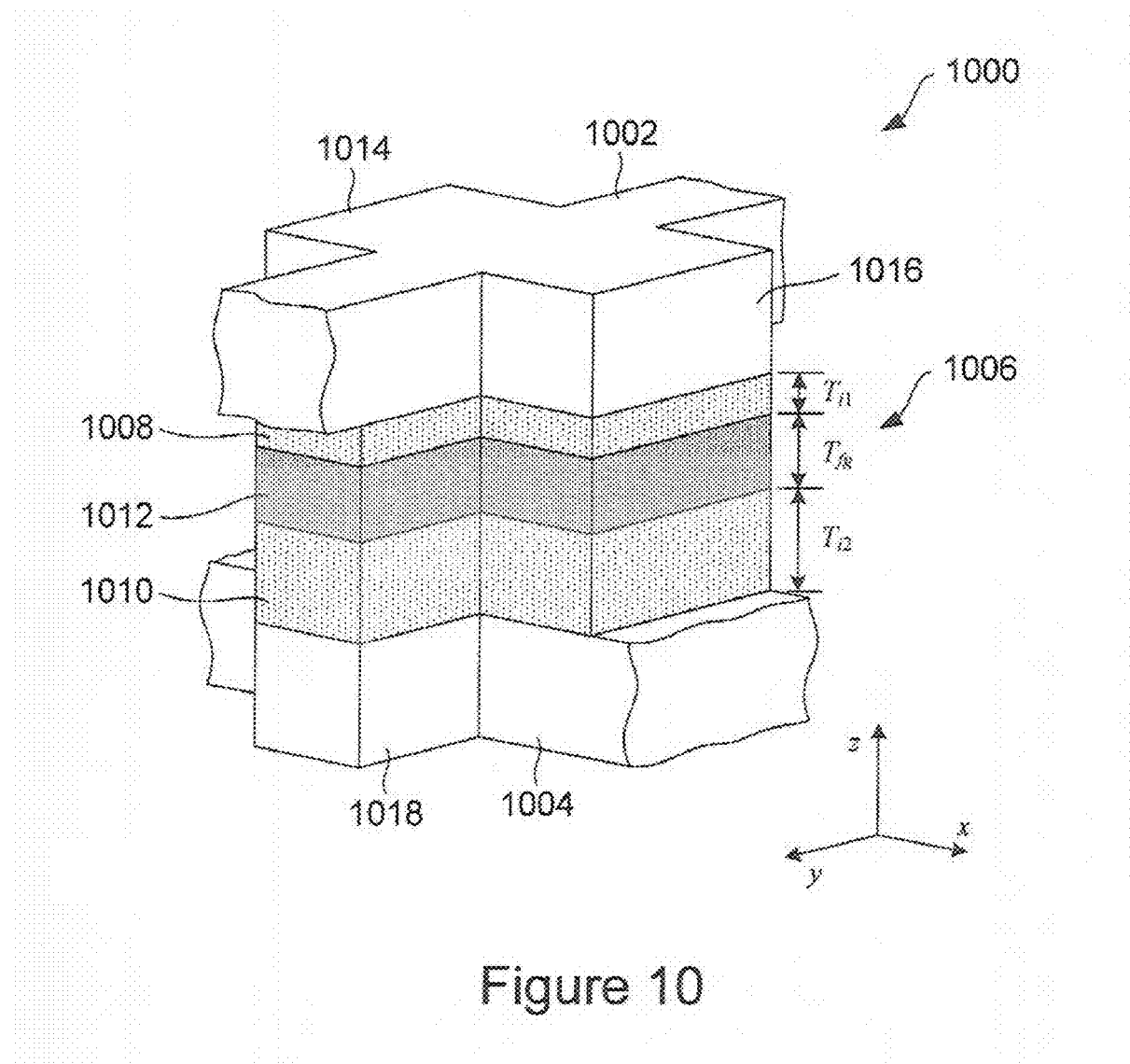
FIG. 10 shows a first resonant element configured in accordance with embodiments of the present invention.

The materials selected for the intermediate layer of the resonant elements exhibit an appreciable refractive index change in response to externally applied electric fields, which can be used to control the resonant behavior of the phase shift, described above with reference to FIG. 9. The refractive index of the resonant elements can vary according to the particular charge density and/or distribution of charges in the materials comprising the intermediate layer. In certain embodiments, the intermediate layer can be composed of a floating gate sandwiched between dielectric insulating layers. FIG. 10 shows a resonant element 1000 configured in accordance with embodiments of the present invention. The resonant element comprises a portion of a first nanowire 1002 in a first layer of nanowires extending in the x-direction overlaying a portion of a second nanowire 1004 in a second layer of nanowires extending the y-direction. The resonant element 1000 includes an electronically erasable and programmable intermediate layer 1006 comprising a first dielectric insulation layer 1008, a second dielectric insulation layer 1010, and a floating gate 1012 sandwiched between the insulation layers 1008 and 1010. As shown in FIG. 10, the intermediate layer 1006 substantially fills the space between fingers 1014 and 1016 of the first nanowire 1002 and the second nanowire 1004 and fills the space between the fingers 1015 (other finger not shown) of the second nanowire 1004 and the first nanowire 1002. FIG. 10 also reveals that the thickness $T_{i1}$ of the first dielectric insulation layer 1008 is greater than thickness $T_{i2}$ of the second dielectric insulation layer 1010.

The floating gate 1012 can be composed of an elemental semiconductor, such as poly-silicon (Si) and germanium (Ge), or a compound semiconductors including III-V and II-VI semiconductors, where Roman numerals III and V represent elements in the IIIa and Va columns of the Periodic Table of the Elements, and II and VI represent elements in the IIb and VIa columns of the Periodic Table of the Elements. Compound III-V semiconductors include column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Compound II-VI semiconductors include CdSe, ZnSe, ZnS, and ZnO and other suitable II-VI semiconductors. The dielectric insulating layers 1008 and 1010 can be composed of $SiO_2$, $Si_3N_4$, $Al_2O_3$, an insulating composite polymer, or any other suitable dielectric material.

The refractive index of the resonant element 1000 is changed or programmed by varying the charge density of the floating gate 1012. FIGS. 11A-11B show an electronic energy band diagram and electron tunneling associated with electronically programming the refractive index of the resonant element 1000 in accordance with embodiments of the present invention. The thickness $T_{i1}$ of the first dielectric insulation layer 1008 is selected so that when a voltage comprising a negative bias applied to the first nanowire 1002 and a positive bias applied to the nanowire 1004, electrons tunnel through the first dielectric insulation layer 1008 into the conduction band of the floating gate 1012. As shown in FIG. 11A, electrons tunnel through the first insulation layer 1008 filling the lower electronic energy states in the conduction band of the floated gate 1012 identified by shaded region 1104. The thickness $T_{i2}$ of the relatively thicker second dielectric insulation layer 1010 is selected so that electrons cannot tunnel from the conduction band 1104 of the floating gate 1012 into the second nanowire 1004. When the voltage applied to the intermediate layer 1006 is turned "off," electrons remain trapped in the conduction band of the floating gate 1012. As a result, the charge density of the floating gate 1012 is greater than before the voltage was applied to the intermediate layer 1006, and the refractive index of the resonant element 1000 is changed.

The change in the refractive index of the resonant element 1000 is erased by reversing the polarity of the voltage applied to the intermediate layer 1006. A reverse polarity includes applying a positive voltage to the nanowire 1002 and a negative voltage to the nanowire 1004. FIGS. 12A-12B show an electronic energy band diagram and electron tunneling associated with electronically erasing the refractive index of the resonant element 1000 in accordance with embodiments of the present invention. As shown in FIG. 12, reversing the polarity of the voltage across the intermediate layer causes electrons to tunnel from the conduction band 1104 of the floating gate 1012 through the first insulation layer 1008 into the first nanowire 1002. As a result, the charge density of the floating gate 1012 decreases and the refractive index of the resonant element 1000 is restored.

The polarity and magnitude of the voltage applied to the intermediate layer 1006 can be varied in order to vary the charge density and accordingly the refractive index of the resonant element 1000. For example, a voltage with a relatively large magnitude can be applied to the intermediate layer 1006 in order to produce a large charge density increase in the floating gate 1012 and a significant change in the refractive index of resonant element 1000. A voltage with opposite polarity and a relatively smaller magnitude can be subsequently applied to the intermediate layer 1006 in order to reduce the charge density of the floating gate 1012 and accordingly produce a small change in the refractive index of the resonant element 1000.

Figure 13:
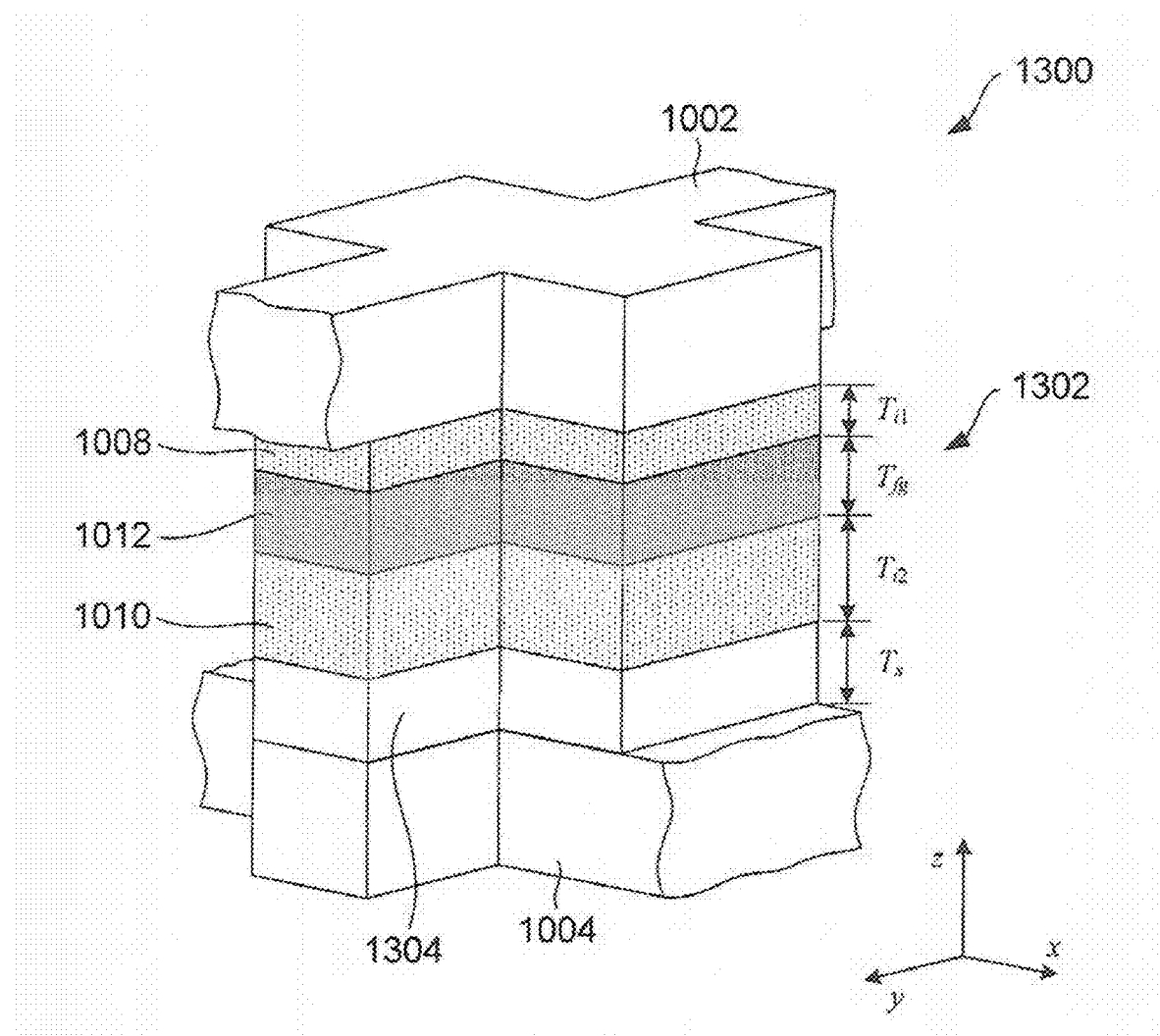
FIG. 13 shows a second resonant element configured in accordance with embodiments of the present invention.

In other embodiments, the intermediate layer of a resonant element can be configured with a second semiconductor layer such that the charge distribution in the second semiconductor layer and/or charge density of the floating gate layer controls the refractive index of the resonant element. FIG. 13 shows a resonant element 1300 configured in accordance with embodiments of the present invention. The resonant element 1300 includes an intermediate layer 1302 that is nearly identical in composition to the intermediate layer 1006 of the resonant element 1000, shown in FIG. 10, except the intermediate layer 1302 includes a second semiconductor layer 1304 sandwiched between the second insulation layer 1010 and the second nanowire 1004. The second semiconductor layer 1304 can be composed of an elemental semiconductor or a compound semiconductor, as described above.

FIGS. 14A-14B show an electronic energy band diagram and electron tunneling associated with electronically programming the refractive index of the resonant element 1300 in accordance with embodiments of the present invention. As shown in FIGS. 14A-14B, when a voltage comprising a negative bias is applied to the first nanowire 1002 and a positive bias is applied to the second nanowire 1004, the narrow thickness $T_{t1}$ of the first dielectric insulation layer 1008 allows electrons to tunnel through the first dielectric insulation layer 1008 into the conduction band of the floating gate 1012, as indicated by shaded region 1404. The thickness $T_{t2}$ of the relatively thicker second dielectric insulation layer 1010 prevents electrons from tunneling from the conduction band 1404 of the floating gate 1012 into the second semiconductor 1304 trapping electrons in the floating gate 1012 and increasing the charge density of the floating gate 1012. As described above with reference to FIG. 11, the electrons remain trapped in the conduction band of the floating gate 1012 even after the voltage is turned "off." The increase in charge density induces a redistribution of charge within the second semiconductor layer 1304 by causing a p-type layer 1406 and an n-type layer 1408 to form within the second semiconductor layer 1304. The p-type layer 1406 forms adjacent to the second insulation layer 1010, and the n-type layer 1408 forms adjacent to the second nanowire 1004. The inversion of charge carriers (i.e., electrons and holes) within the second semiconductor layer 1304 changes the refractive index of the resonant element 1300. The change in charge density in the floating gate 1012 may also contribute to the change the refractive index of the resonant element 1300 as described above with reference to FIG. 11.

The change in the refractive index of the resonant element 1300 can be erased by reversing the polarity of the voltage applied to the intermediate layer 1302. FIGS. 15A-15B show an electronic energy band diagram and electron tunneling associated with electronically erasing the refractive index of the resonant element 1300 in accordance with embodiments of the present invention. As shown in FIG. 15, reversing the polarity of the voltage across the intermediate layer 1302 causes electrons to tunnel from the conduction band 1404 of the floating gate 1012 through the first insulation layer 1008 into the first nanowire 1002. As result, the charge density of the floating gate 1012 decreases and the charge carriers in the p-type and n-type layers 1406 and 1408 become more uniformly distributed. The refractive index of the resonant element 1300 is restored to the refractive index observed prior to applying the voltage as described with reference to FIG. 14.

The polarity and magnitude of the voltage applied to the intermediate layer 1302 can be varied in order to vary the charge density of the floating gate 1012 and thus the distribution of charge within the second semiconductor layer 1304 and accordingly vary the refractive index of the resonant element 1300. For example, a voltage with a relatively large magnitude can be applied to the intermediate layer 1006 producing a large charge density increase in the floating gate 1012, which in turn causes a large redistribution of charge within the second semiconductor layer 1304 and a significant change in the refractive index of the intermediate layer 1302. A voltage with opposite polarity and a relatively smaller magnitude can be subsequently applied to the intermediate layer 1302 in order to reduce the charge density of the floating gate 1012 and accordingly reduce the level to which charges are redistributed within the second semiconductor layer 1304 producing a small change in the refractive index of the resonant element 1300.

Dynamically Reconfigurable Holograms

Dynamically reconfigurable holograms can be configured with NIM crossbars and resonant elements described above in the subsections Negative Index Material Crossbars and Resonant Elements.

Figure 16:
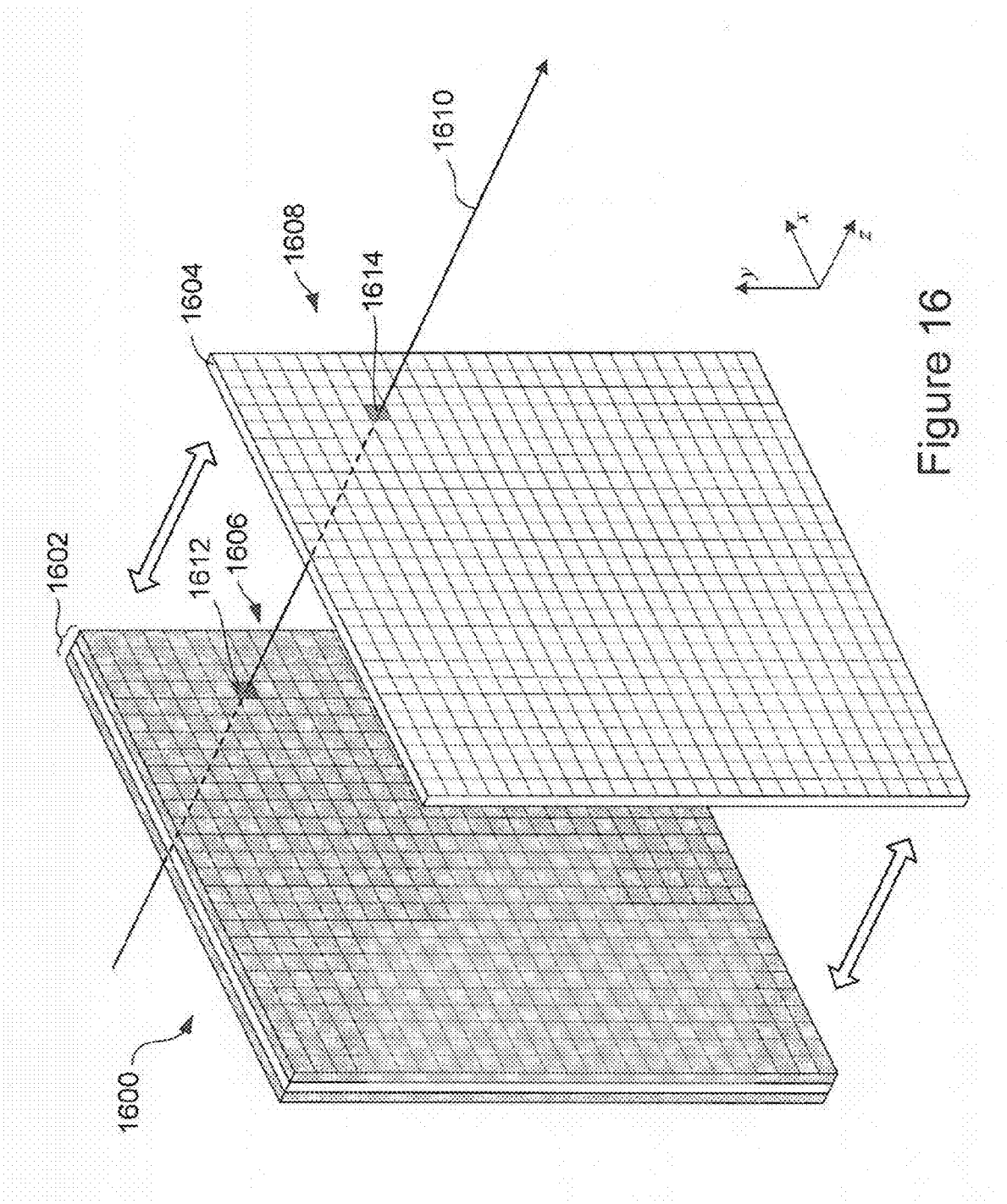
FIG. 16 shows an exploded isometric view of an electronically addressable dynamic hologram configured in accordance with embodiments of the present invention.

FIG. 16 shows an exploded isometric view of an electronically addressable and dynamically reconfigurable hologram 1600 configured in accordance with embodiments of the present invention. The hologram 1600 includes a phase-control layer 1602 and an intensity-control layer 1604. The surface 1606 of phase-control layer 1602 and the surface 1608 of intensity-control layer 1604 include grid lines that outline two different two-dimensional arrays of squares. Each square represents a pixel, and each pixel of phase-control layer 1602 is substantially aligned with a pixel of intensity-control layer 1604. The pixels in phase-control layer 1602 are referred to as "phase-modulation pixels" and the pixels in intensity-control layer 1604 are referred to as "intensity-control pixels." For example, as shown in FIG. 16, directional arrow 1610 passes through a highlighted first phase-modulation pixel 1612 located in phase-control layer 1602 and passes through a second highlighted intensity-control pixel 1614 located in intensity-control layer 1604.

The phase-control layer 1602 is a resonant plasmonic metamaterial that can be operated to exhibit negative refraction for particular wavelengths of light. The resonant behavior translates into large phase changes of refracted light. The refractive index of each phase-modulation pixel in phase-control layer 1602 can be independently and electronically controlled, and the transparency of each intensity-control pixel in intensity-control layer 1604 can also be independently and electronically controlled. In other words, the phase-modulation pixels and the intensity-control pixels are "electronically addressable." For a ray of light passing through any pair of aligned phase-modulation and intensity-control pixels, a transmission phase can be applied to the ray by the phase-modulation pixel in phase-control layer 1602 followed by a reduction in the intensity produced by the corresponding intensity-control pixel in the intensity-control layer 1604. For example, suppose directional arrow 1610 represents a ray of light originating from a light source (not shown) located behind phase-control layer 1602. As the ray passes through the phase-modulation pixel 1612, a first voltage applied to the pixel 1612 induces a change in the refractive index of the pixel 1612. As a result, the ray 1610 acquires a transmission phase as it emerges from the pixel 1612, and it may also exhibit an intensity decrease due to insertion loss. As the ray subsequently passes through intensity-control pixel 1614, a second voltage applied to the pixel 1614 changes the transparency of the pixel 1614 and, thus, adjusts the intensity of the ray as it emerges from the intensity-control layer 1604 to render a holographic image by taking into account any optical insertion losses. In other words, the phase-control layer 1602 and the intensity-control layer 1604 can be operated in conjunction to produce both transmission phases and intensity variations in light transmitted through individual pixels of the phase-control layer 1602 and the intensity-control layer 1604. As a result, three-dimensional images can be produced by the collective optical effect of controlling the wavefront and the intensity of light emerging from the hologram 1600. Because the effective refractive index and the intensity of each pixel can be separately and electronically controlled, three-dimensional motion pictures can be produced. A more detailed description of the operation of the hologram 1600 is described below.

Embodiments of the present invention are not limited to a one-to-one correspondence between phase-modulation pixels and intensity-control pixels. In other embodiments, the phase-modulation pixels and intensity-control pixels can be arranged and configured so that light is transmitted through one or more phase-modulation pixels and subsequently is transmitted through one or more intensity-control pixels.

Figure 17:
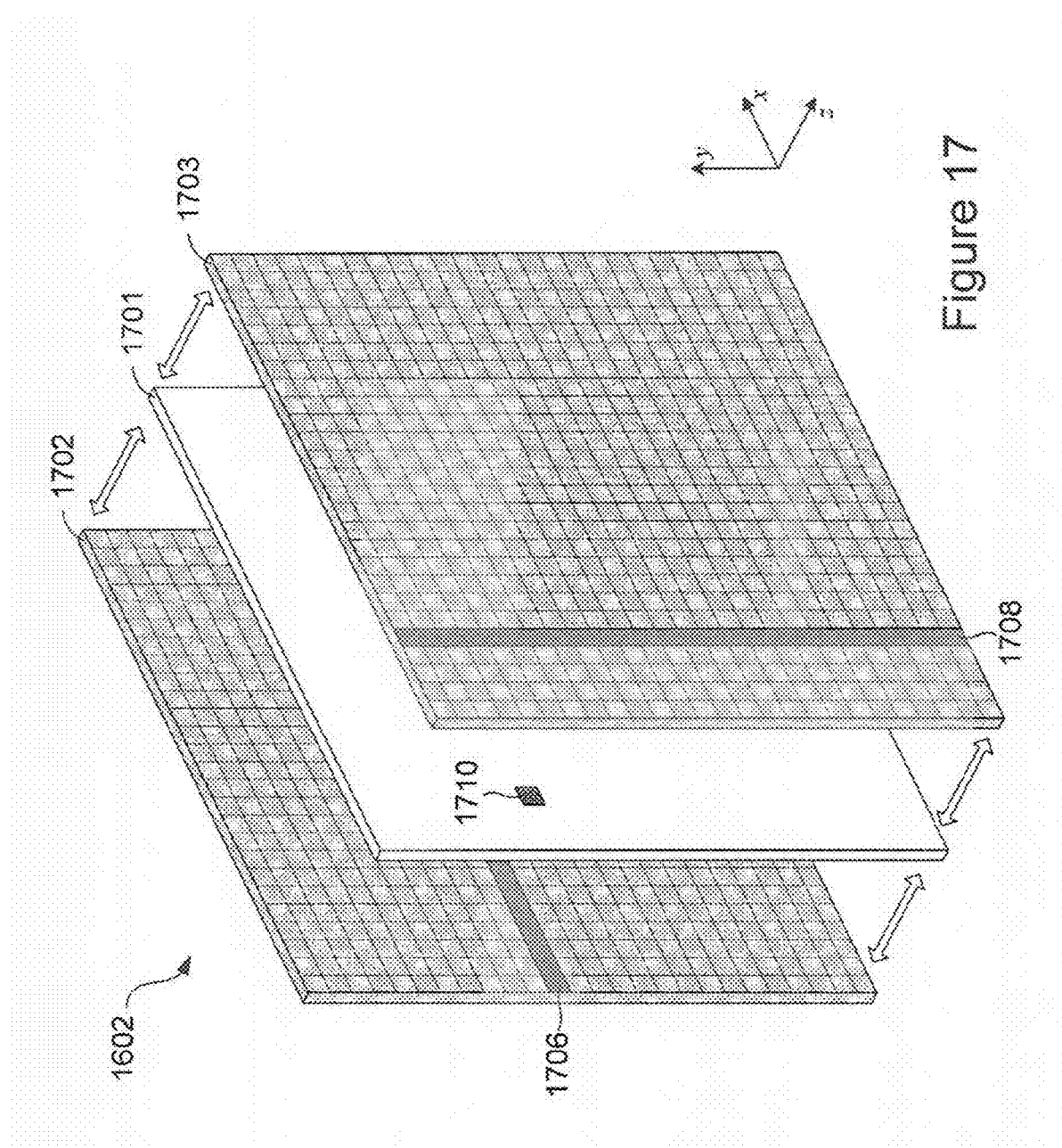
FIG. 17 shows an exploded isometric view of a phase-control layer configured in accordance with embodiments of the present invention.

FIG. 17 shows an exploded isometric view of the phase-control layer 1602 configured in accordance with embodiments of the present invention. As shown in FIG. 17, the phase-control layer 1602 comprises an intermediate phase-modulation layer 1701 sandwiched between two outer conductive layers 1702 and 1703. Each phase-modulation pixel can be electronically addressed as follows. The conductive layers 1702 and 1703 are configured so that voltages can be applied to substantially orthogonal overlapping strips or bands of the conductive layers 1702 and 1703. Each intersection of overlapping strips in layers 1702 and 1703 corresponds to a phase-modulation pixel in the phase-control layer 1602. For example, as shown in FIG. 17, applying an appropriate voltage or current to a first strip 1706 of conductive layer 1702 running substantially parallel to the x-axis and simultaneously applying an appropriate voltage or voltage to a second strip 1708 of conductive layer 1703 running substantially parallel to the y-axis produces a voltage across a region 1710 of layer 1701 between the overlapping strips 1706 and 1708. As a result, the refractive index of the region 1710 is changed. The degree to which the refractive index is changed can vary depending on the magnitude of the voltage difference created across the region 1710. Thus, a phase-modulation pixel in the phase-control layer 1602 includes a region of phase-modulation layer 1701 sandwiched between substantially orthogonal, overlapping strips of conductive layers 1702 and 1703, and the refractive index of the phase-modulation pixel is controlled by applying appropriate voltages to the overlapping strips.

Figure 18:
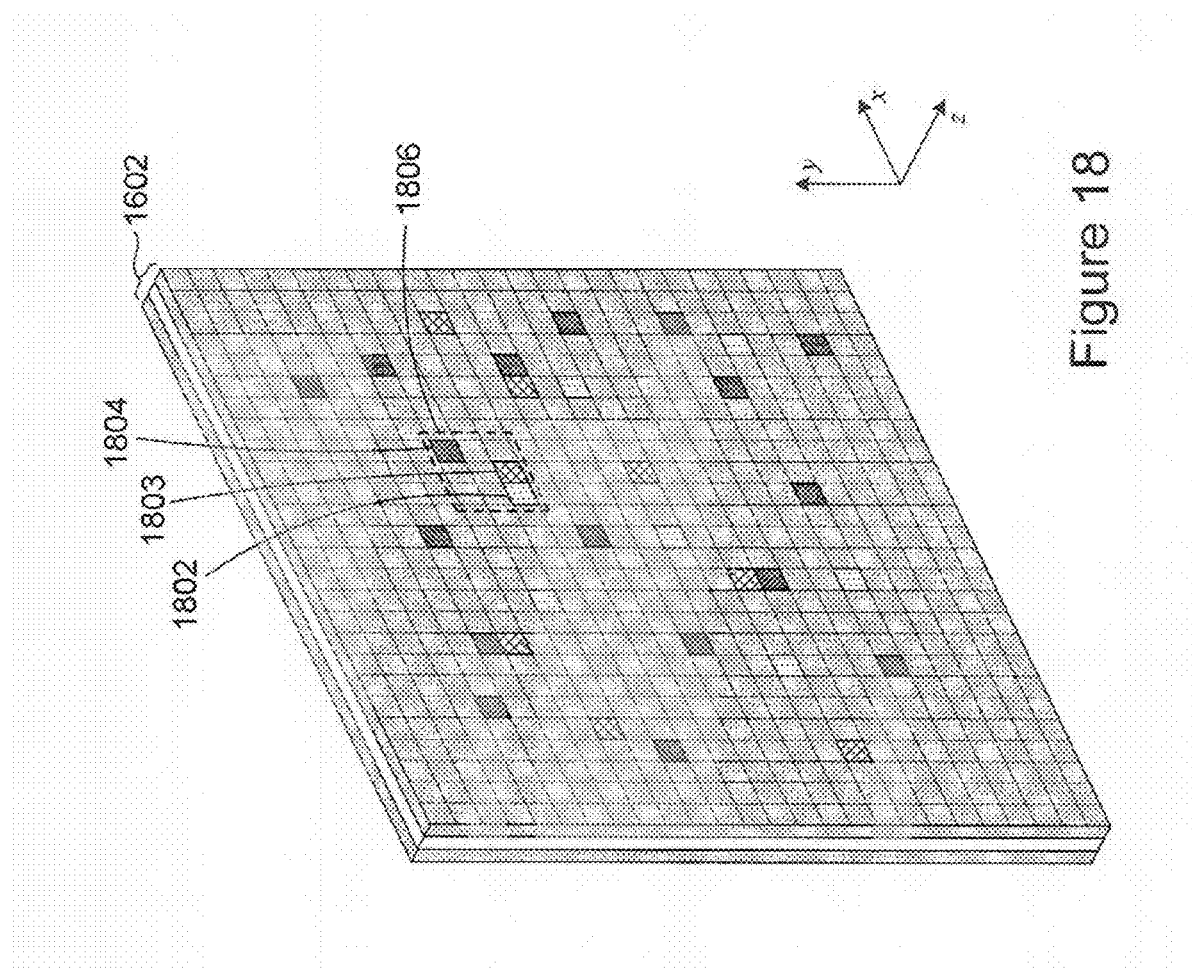
FIG. 18 shows a number of highlighted phase-modulation pixels associated with different refractive indices in accordance with embodiments of the present invention.

The refractive index of each pixel can be varied by applying a different voltage to each pixel. FIG. 18 shows a number of highlighted phase-modulation pixels having different refractive indices in accordance with embodiments of the present invention. Each pixel is electronically addressable as described above with reference to FIG. 17, and depending on the magnitude of the voltage applied to each pixel, the effective refractive index of each pixel can be separately adjusted. For example, shaded pixels 1802-1804 each represent pixels having different effective refractive indices which result from applying different voltages to each of the pixels 1802-1804. The change in the effective refractive index can range from a few percent to approximately 10%, but coupled with a resonant negative pixel, the change in the refractive index is larger.

The phase-control layer 1602 can be composed of a NIM crossbar, and each electronically addressable phase-modulation pixel can be composed of one or more resonant elements. FIG. 19 shows an isometric view and an enlargement of a region 1902 of the phase-control layer 1602 shown in FIG. 16 configured in accordance with embodiments of the present invention. The enlarged region 1902 reveals that the phase-control layer 1602 is implemented as a NIM crossbar comprising an intermediate layer sandwiched between a first layer of substantially parallel nanowires 1904 and a second layer of approximately parallel nanowires 1906, where the nanowires in the first layer 1904 are approximately perpendicular to the nanowires in the second layer 1906. The NIM crossbar and resonant elements are configured and operated as described above with reference to the subsections Negative Index Material Crossbars and Resonant Elements.

FIG. 20 shows an isometric view and enlargement of a region 1806 of the phase-control layer 1602 shown in FIG. 18 configured in accordance with embodiments of the present invention. The pixels 1802-1804 of FIG. 18 are enlarged and identified by dashed-line enclosures. The pixels 1802-1804 are each composed of a square array of 9 resonant elements. A change in the refractive index of a pixel is the result of changes in the refractive indices of the resonant elements comprising the pixel. As described above in the subsections Negative Index Material Crossbars and Resonant Elements, a refractive index change of a resonant element can be the result of changes in the charge density and/or distribution of charge within the portion of the intermediate layer comprising a resonant element. As shown in FIG. 20, the individual nanowires of the pixels 1802-1804 are electronically coupled to voltage sources so that the resonant elements of each pixel can be individually and electronically addressed. In order to change the refractive index of the resonant elements comprising the pixel 1802, the nanowires of the pixel 1802 are electronically addressed by applying the same voltage $V_3$ to the nanowires 2001-2003 and a different voltage $V_4$ to all three of the nanowires 2004-2006 resulting in applying the same voltage across each of the nine resonant elements comprising the pixel 1802. As a result, the refractive indices of the individual resonant elements comprising the pixel 1802 are changed to the same refractive index, and light transmitted through the pixel 1802 acquires a transmission phase associated with the refractive index of the resonant elements comprising the pixel 1802. For example, the refractive index of the nine resonant elements comprising the pixel 1802 can be shifted as described above with reference to plot 902 of FIG. 9. The pixels 1803 and 1804 are also separately and electronically addressed by applying different sets of voltages to the nanowires comprising the pixels 1803 and 1804 to produce different refractive indices associated with each pixel.

FIG. 21A show cross-sectional view along a line 21A-21A, shown in FIG. 20, of the pixel 1802 operated in accordance with embodiments of the present invention. Shaded intermediate layers 2102-2104 represent three of the intermediate layers in the nine resonant elements comprising the pixel 1802. FIG. 21B show cross-sectional view along a line 21B-21B, shown in FIG. 20, of the pixel 1803 operated in accordance with embodiments of the present invention. Shaded intermediate layers 2106-2108 represent three of the intermediate layers in nine the resonant elements comprising the pixel 1803. FIG. 21C show cross-sectional view along a line 21C-21C, shown in FIG. 20, of the pixel 1804 operated in accordance with embodiments of the present invention. Shaded intermediate layers 2110-2112 represent three of the nine intermediate layers of the resonant elements comprising the pixel 1804.

Embodiments of the present invention are not limited to pixels comprising a square array of nine resonant elements. Because voltages can be applied to individual crossed nanowires, the number of square array resonant elements comprising a single pixel can range from as few as 4 to hundreds even thousands of resonant elements. In addition, the individual nanowires enable pixels to have various shapes such as square, rectangular, circular, elliptical, triangular, or any other suitable shape.

Figure 22:
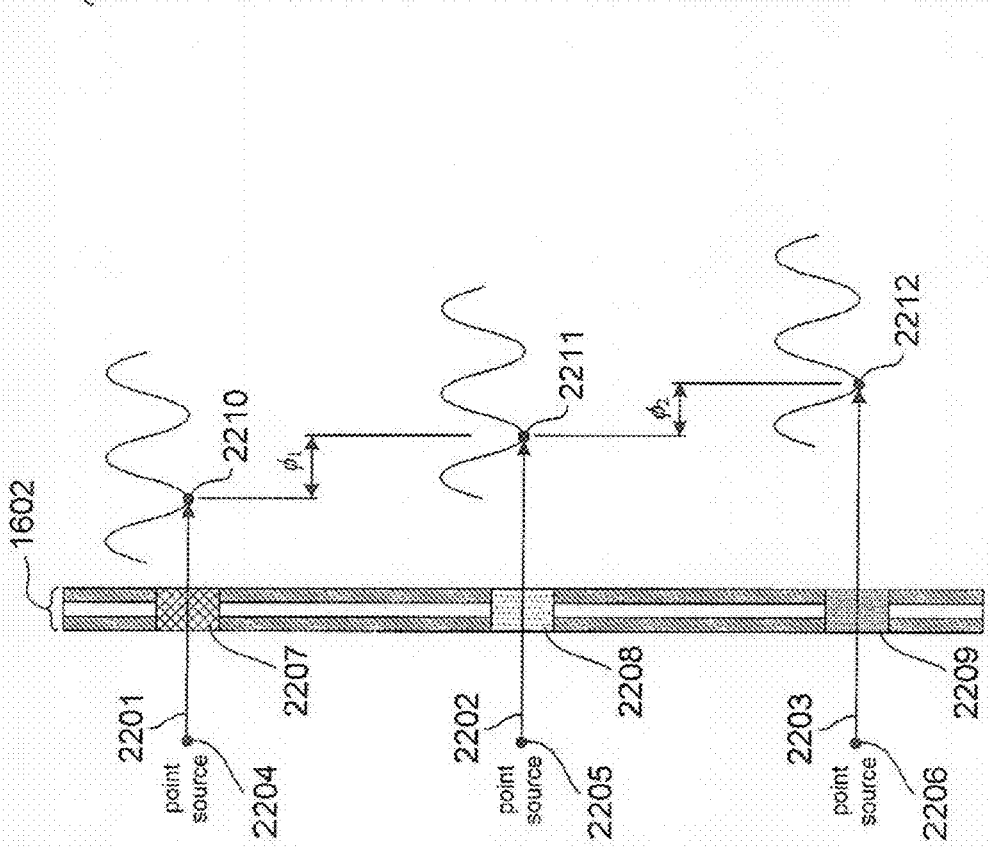
FIG. 22 shows a side view of rays of light passing through three pixels of a phase-control layer operated in accordance with embodiments of the present invention.

FIG. 22 shows a side view of rays of light transmitted through three pixels of the phase-control layer 1602 operated in accordance with embodiments of the present invention. Rays of light 2201-2203 emanating from point sources 2204-2206 pass through pixels 2207-209, respectively. In the example shown in FIG. 22, each pixel is electronically addressed, as described above with reference to FIG. 20, and has a different refractive index with pixel 2207 having the largest refractive index, pixel 2208 having the second largest refractive index, and pixel 2209 having the smallest refractive index. As rays 2201-2203 enter associated pixels 2207-2209, the light slows to a velocity v=c/n, where v is the velocity of light propagating through a pixel, c is the speed of light in free space, and n is the refractive index of the pixel. Thus, the ray 2204 passing through the pixel 2207 has the slowest velocity, the ray 2205 passing through the pixel 2208 has the second slowest velocity, and the ray 1806 has the highest relative velocity. Points 2210-2212 represent points on electromagnetic waves that simultaneously enter the pixels 2207-2209, respectively, but due to the different refractive indices at each pixel, the points 2210-2212 of the electromagnetic waves emerge at different times from the pixels 2207-2209 and, therefore, are located at different distances from the phase-control layer 1602. In other words, the electromagnetic waves emerging from the pixels 2207-2209 acquire transmission phase shifts. As shown in FIG. 22, the relative phase difference between the electromagnetic waves emerging from pixels 2207 and 2208 is $\phi_1$, and the relative phase difference between electromagnetic waves emerging from pixels 2208 and 2209 is $\phi_2$, with the greatest relative phase difference of $\phi_1+\phi_2$ for electromagnetic waves emerging from pixels 2207 and 2209. The voltage applied to the pixels 2207-2209 can be rapidly modulated, which, in turn, rapidly modulates the refractive indices of the pixels 2207-2209 resulting in rapid changes in relative phase differences between rays emerging from the pixels 2207-2209.

Figure 23:
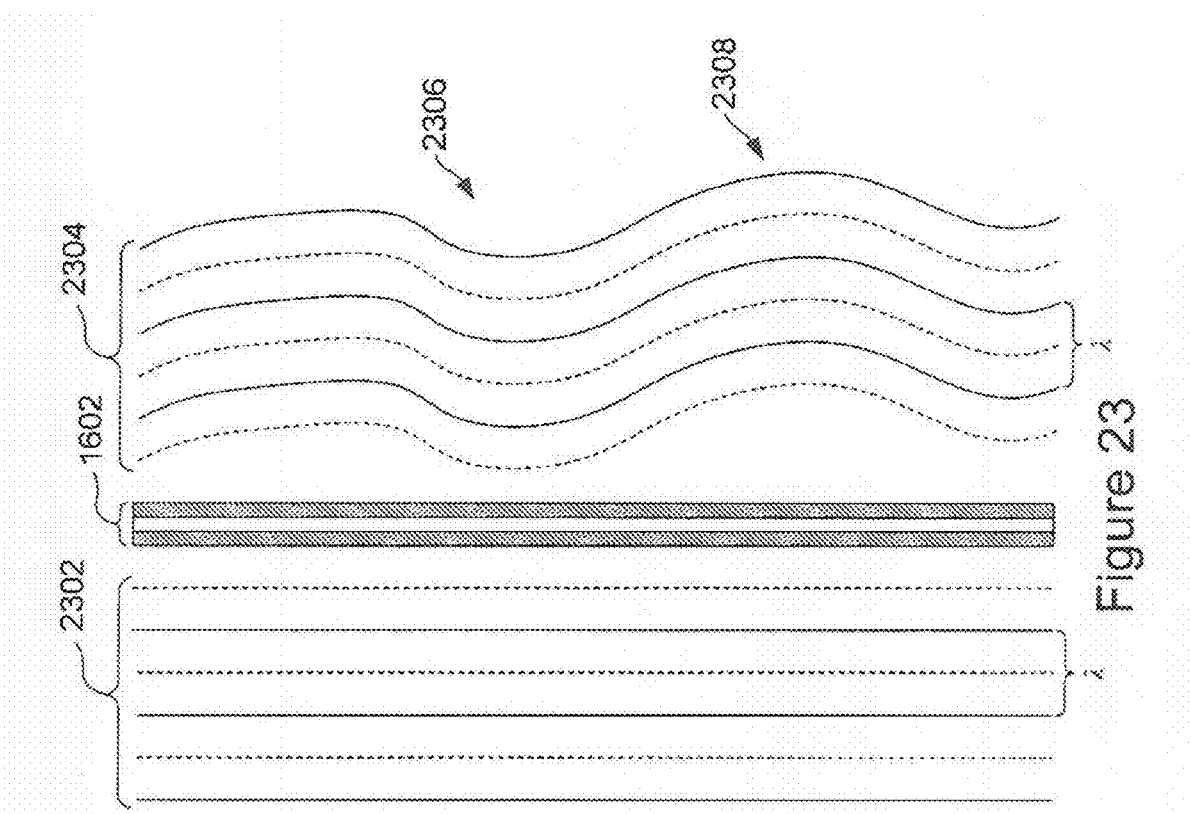
FIG. 23 shows a side view of quasimonochromatic light wavefront passing through a phase-control layer in accordance with embodiments of the present invention.

FIG. 23 shows a side view of quaimonochromatic light entering and emerging from the phase-control layer 1602 in accordance with embodiments of the present invention. Ideally monochromatic light is used. However, in practice it is recognized that a light sources does not emit true monochromatic light but instead can emit light in a narrow band of wavelengths, which is called "quasimonochomatic light." Quasimonochromatic light enters the phase-control layer 1602 with uniform wavefronts 2302 of wavelength λ. Each wavefront crest is identified by a solid line and each wavefront trough is identified by a dashed line. As shown in FIG. 23, each wavefront enters the phase-control layer 1602 with substantially the same phase. The pixels (not identified) of the phase-control layer 1602 are selectively addressed to produce non-uniform wavefronts 2304 by affecting the transmission phase of different portions of the non-uniform wavefront 2304. The non-uniform wavefronts 2304 can result from certain portions of the incident uniform wavefronts 2302 passing through pixels that have been electronically configured with relatively different refractive indices. For example, portions of non-uniform wavefronts in region 2306 emerge from the phase-control layer 1602 later than portions of non-uniform wavefronts in region 2308. In other words, the phase-control layer 1602 is configured to introduce relatively large transmission phase differences between portions of wavefronts emerging in region 2306 and portions of wavefronts emerging in region 2308. The non-uniform wavefront 2304 contains substantially all the information needed to reproduce wavefronts reflected from an object when viewed over a particular range of viewing angles.

Light emerging from phase-modulation pixels of the phase-control layer 1602 pass through corresponding intensity-control pixels of intensity-control layer 1604, as described above with reference to FIG. 16. Each intensity-control pixel can be filled with a liquid crystal. In certain embodiments, the intensity-control layer 1604 can be a liquid crystal layer. Each intensity-control pixel of intensity-control layer 1604 typically consists of a layer of liquid crystal molecules aligned between two transparent electrodes, and two polarizing filters with substantially perpendicular axes of transmission. The electrodes are composed of a transparent conductor such as Indium Tin Oxide ("ITO"). Thus, with no liquid crystal filling the pixel between the polarizing filters, light passing through the first filter is blocked by the second filter. The surfaces of the transparent electrodes contacting the liquid crystal material are treated with a thin polymer molecule that aligns the liquid crystal molecules in a particular direction.

Before applying an electric field to a pixel, the orientation of the liquid crystal molecules is determined by the alignment of the polymer deposited on surfaces of the transparent electrode. An intensity-control pixel comprising twisted nematic liquid crystals, the surface alignment direction of the polymer on the first electrode is substantially perpendicular to the alignment direction of the polymer on the second electrode, and the liquid crystal molecules between the electrodes arrange themselves in a helical structure. Because the liquid crystal is birefringent, light passing through one polarizing filter is rotated by the liquid crystal helix allowing the light to pass through the second polarized filter.

When a voltage is applied across the electrodes of an intensity-control pixel, a torque is created that aligns the liquid crystal molecules parallel to the electric field, distorting the helical structure. This reduces the rotation of the polarization of the incident light, and the pixel appears grey. When the applied voltage is large enough, the liquid crystal molecules are almost completely untwisted and aligned with the electric field, and the polarization of the incident light is not rotated as it passes through the liquid crystals. This light will then be mainly polarized perpendicular to the second filter, and as a result, the light is blocked by the second filter and the pixel appears black. By controlling the voltage applied to each intensity-control pixel, the intensity of light passing through each intensity-control pixel can be varied thus constituting different levels of grey.

Figure 24:
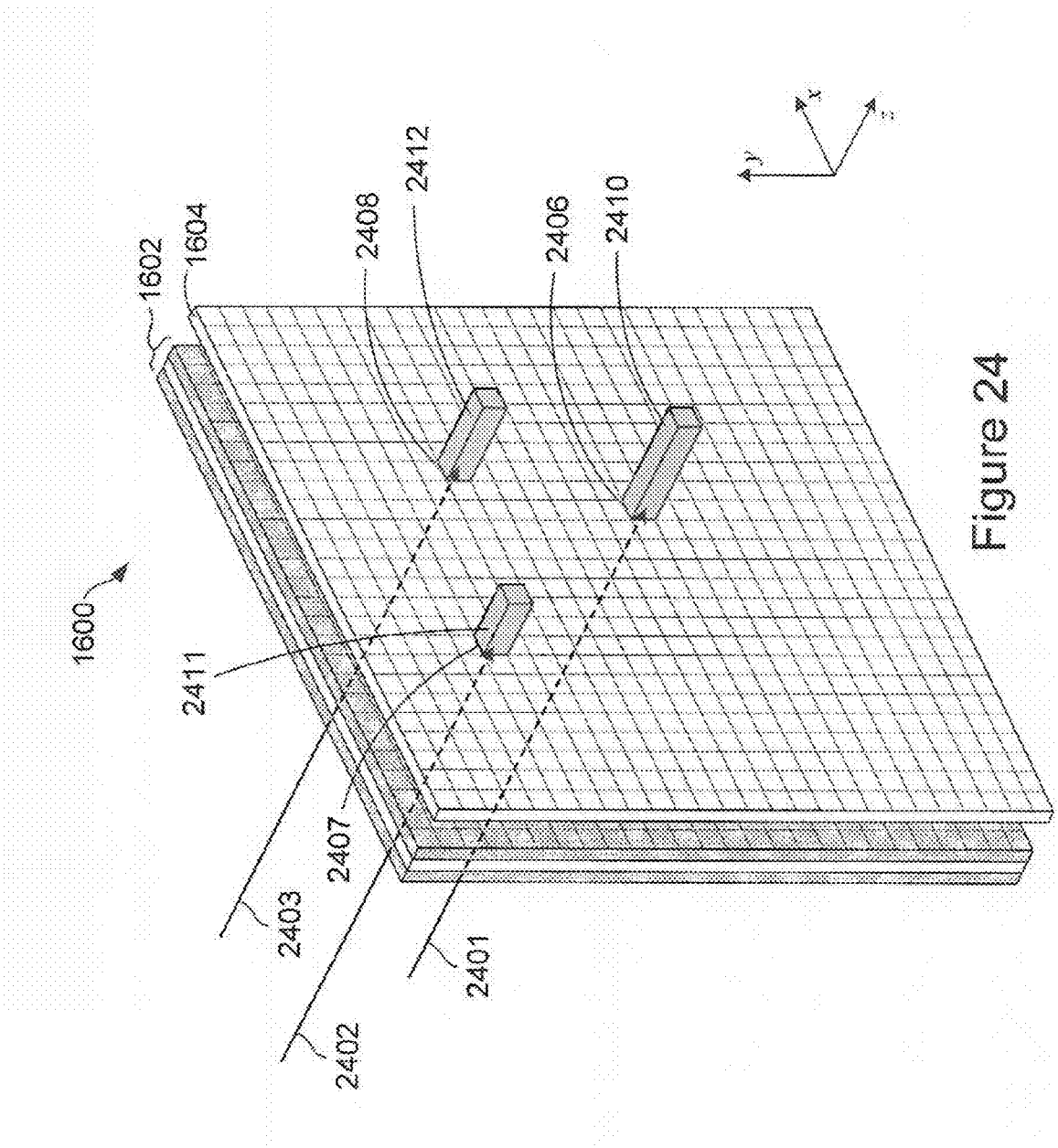
FIG. 24 shows intensity levels associated with rays passing through pixels of a phase-modulation layer and an intensity-control layer in accordance with embodiments of the present invention.

FIG. 24 shows intensity levels associated with rays 2401-2403 passing through pixels of phase-control layer 1602 and intensity-control layer 1604 in accordance with embodiments of the present invention. The rays emerging from phase-modulation pixels in phase-control layer 1602 pass through intensity-control pixels 2406-2408 that are each configured to produce a different intensity level. As shown in FIG. 24, bars 2410-2412 represent intensity levels of light emerging from intensity-control pixels 2406-2408. The length of bar 2411 is shorter than the length of bar 2410 representing the relatively lower intensity level of light emerging from pixel 2407 than from pixel 2406. The intensity level of light emerging from an intensity-control pixel is selectively determined by the magnitude of the voltage applied to the pixel. For example, a relatively higher voltage applied to pixel 2407 than to pixel 2406 results in a relatively lower intensity level for light emerging from pixel 2407 than for light emerging from pixel 2406.

In other embodiments, color filters can be placed over each intensity-control pixel so that colored light emerges from each intensity-control pixel. For example, three adjacent intensity-control pixels can be combined to form an RGB color pixel. Red, green, and blue primary color filters can be placed over each of three adjacent intensity-control pixels. A red filter can be placed over a first pixel, a blue filter can be placed over a second pixel, and a green filter can be placed over a third pixel. Light of varying colors can be generated by varying the intensity of light passing through each of the three pixels of the RGB pixel. In other embodiments, different colors can be used for the three intensity-control pixels comprising the color pixel. For example, cyan, magenta, and yellow filters can be placed over each of three adjacent intensity-control pixels. Note that since the intensity-control pixels are configured with subwavelength dimensions, in other embodiments groups of pixels can be configured such that each of the group of pixels respond to different quasimonochromatic light such as red, green and blue light. The group of pixels can have subwavelength dimensions and dynamically generate a color hologram.

Figure 25:
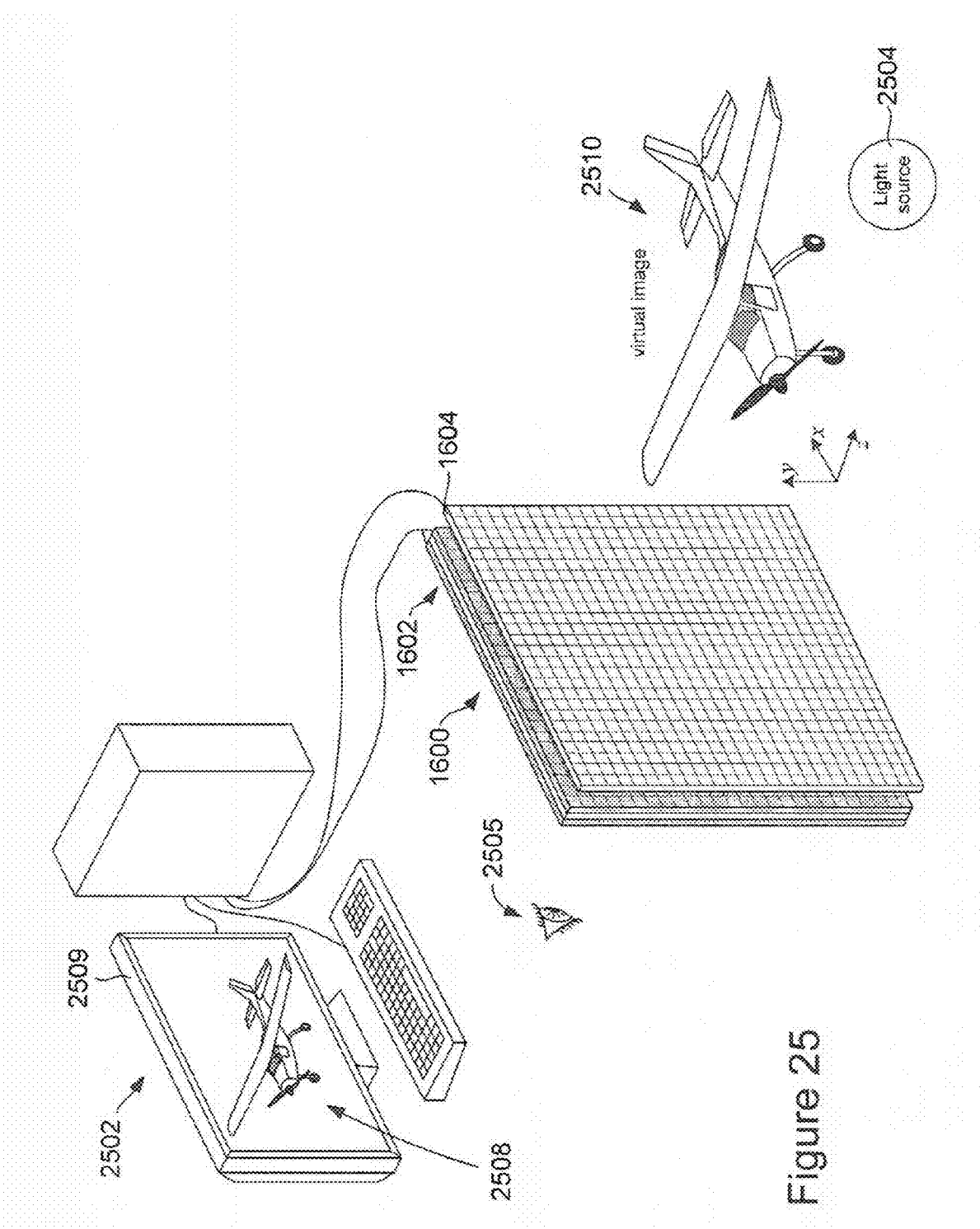
FIG. 25 shows a system for generating three-dimensional images in accordance with embodiments of the present invention.

FIG. 25 shows a system for generating three-dimensional images in accordance with embodiments of the present invention. The system comprises a computer system 2502, an electronically addressable dynamic hologram 1600, and a light source 2504. The computer system 2502 includes a processor and memory that processes and stores the data representing various images of objects and scenes. The images are stored in the memory as data files comprising three dimensional coordinates and associated intensity and color values. A three dimensional image of an object can be displayed on one side of the hologram 1600 as follows. The light source 2504 is positioned and configured to emit quasimonochromatic light that passes through the layers 1602 and 1604 of the hologram 1600 to a viewer 2505 located on the opposite side of the hologram 1200. A program stored on the computer system memory displays the image as a three-dimension virtual image that appears suspended behind the hologram 1600 by translating the data files into electronic addresses that are applied to particular phase-modulation pixels in phase-control layer 1602 and intensity-control pixels in intensity-control layer 1604. Light passing through each phase-modulation pixel acquires an appropriate transmission phase and passing through each intensity-control pixel acquires an intensity level adjustment in order to reproduce the wavefront reflected by the object over a range of viewing angles. As a result, the image stored in the computer is perceived by a viewer 2504 as a three-dimensional object suspended behind the hologram 1600. The image observed by the viewer is called a "virtual image." For example, as shown in FIG. 25, the computer system 2502 displays a two-dimensional image of an airplane 2508 on a monitor 2509 and displays a three-dimensional virtual image 2510 of the same airplane on the side of the hologram 1600 opposite the viewer 2505.

Figure 26A:
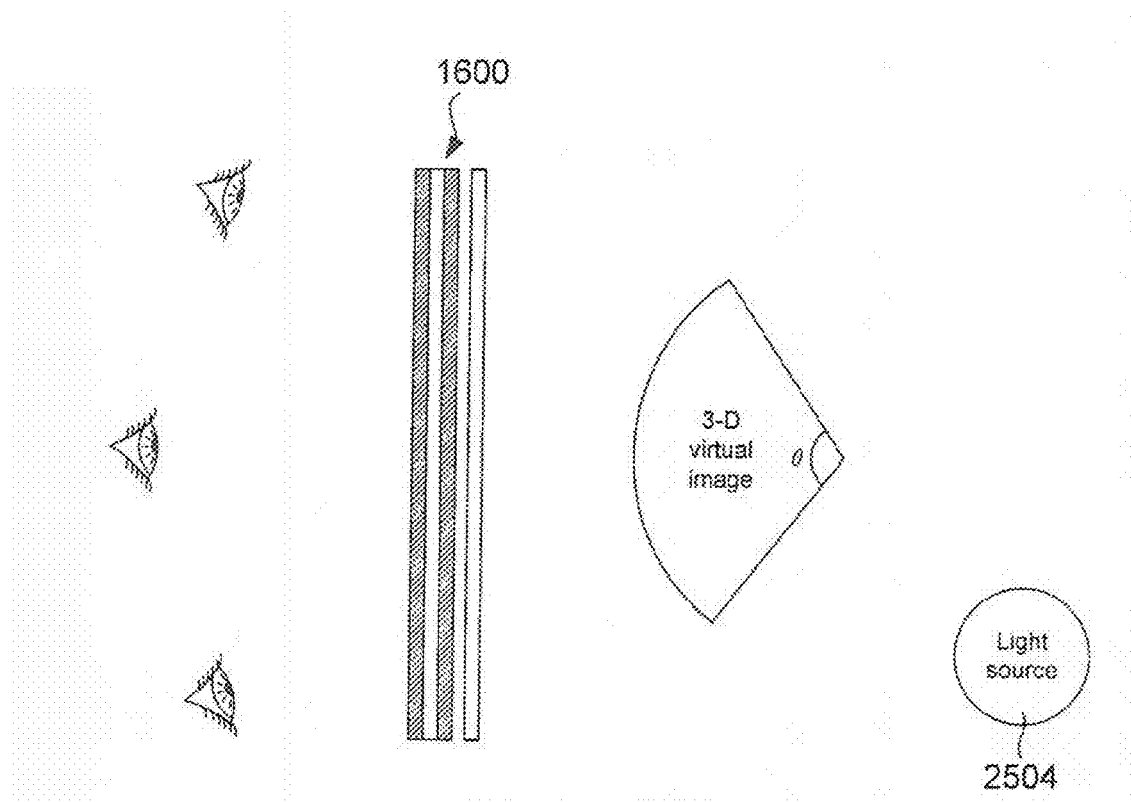
FIG. 26A shows a schematic representation of a viewing angle over which an viewer can view a three-dimensional virtual image with a hologram configured in accordance with embodiments of the present invention.

FIG. 26A shows a schematic representation of a viewing angle over which a viewer can view a three-dimensional virtual image with the hologram 1600 in accordance with embodiments of the present invention. A viewer looks through the hologram 1600 and sees a three-dimensional virtual image in depth, and by varying the viewer's viewing position within the viewing angle θ, the viewer can change the perspective of the view. Because each phase-modulation pixel and intensity-control pixel is electronically addressable and the refractive index of each pixel can be rapidly changed, moving virtual images, such as motion pictures, of three-dimensional objects and scenes can be displayed.

Figure 26B:
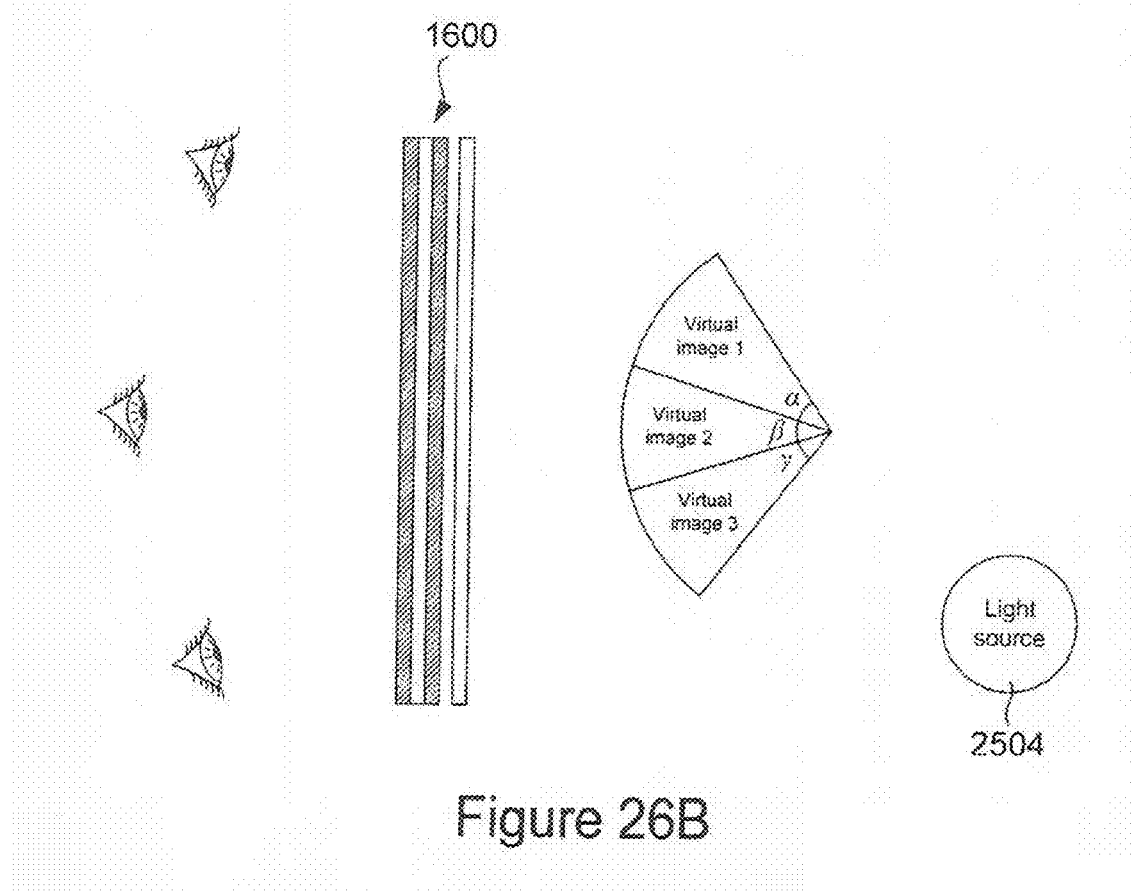
FIG. 26B shows a schematic representation of a hologram displaying three different three-dimensional images in accordance with embodiments of the present invention.

Operation of the hologram 1600 is not limited to producing a single three-dimensional image. In other embodiments, the hologram 1600 can be used to simultaneously produce one or more images, where each image can be viewed over a different range of viewing angles. FIG. 26B shows a schematic representation of the hologram 1600 displaying three different three-dimensional images in accordance with embodiments of the present invention. The pixels of the hologram 1600 are individually and electronically addressed to produce interfering wavefronts producing three separate and distinct three-dimensional virtual images that can each be viewed over different viewing angles. For example, as shown in FIG. 26, the three-dimensional virtual images 1-3 can each be viewed over different viewing angles α, β, and γ, respectively. A viewer can view the three-dimensional virtual image 1 over the range of viewing angles α. As the viewer changes position to view the three-dimensional virtual image 2 over the range of viewing angles β, the three-dimensional virtual image 1 appears to morph into the three-dimensional virtual image 2.

Although the present invention has been described in terms of particular embodiments, it is not intended that the invention be limited to these embodiments. Modifications will be apparent to those skilled in the art. For example, embodiments of the present invention are not limited to the light source 2504 being positioned on the side of the hologram 1600 opposite the image. In other embodiments, the hologram 1600 can be operated in a reflective mode where the light source 2504 can be positioned and configured to emit quasimonochromatic light reflected off of pixels of the layers 1602 of the hologram 1600 creating an image on the opposite side of the light source 2504. In other embodiments, more than one phase-control layer can be included to control the phase and more than one intensity-control layer can be included to control the intensity. In addition, when the resonant elements of the phase-control layer 1602 comprise memristors, as described above with reference to FIGS. 9-10, the relative phase differences of the last image displayed are stored in the resistance states of the memristor layers. Thus, the last image viewed can be displayed by simply turning on the light source 2504 and the intensity-control layer 1604 without having to electronically configure the phase-modulation pixels of the phase-control layer 1602. Embodiments of the present invention are not limited to light first passing through the phase-control layer 1602 followed by light passing through the intensity-control layer 1604. In other embodiments, a hologram can be configured and operated in accordance with embodiments of the present invention where light first passes through the intensity-control layer 1604 and then passes through the phase-control layer 1602.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

The invention claimed is:

1. An electronically programmable and erasable negative index material crossbar comprising:
   a first layer of approximately parallel nanowires, each nanowire having substantially regularly spaced fingers;
   a second layer of approximately parallel nanowires that overlay the nanowires in the first layer, each nanowire having substantially regularly spaced fingers, wherein the nanowires in the first layer are approximately perpendicular in orientation to the nanowires in the second layer, the substantially regularly spaced fingers of a respective nanowire in the first layer being approximately parallel to corresponding ones of the nanowires in the second layer; and
   resonant elements at nanowire intersections, each resonant element including two fingers of a nanowire in the first layer, two fingers of a nanowire in the second layer, and an intermediate layer sandwiched between the nanowire in the first layer and the nanowire in the second layer, wherein a refractive index of a first one of the resonant elements is to be controlled by a change in charge density within the intermediate layer.

2. The crossbar of claim 1 wherein:
   respective ones of fingers of adjacent nanowires within a same layer are substantially aligned;
   notches between the fingers of the nanowires in the first layer are substantially aligned with notches between the fingers of the nanowires in the second layer; and
   cross-sectional dimensions of the nanowires in the first layer are relatively larger than cross-sectional dimensions of the nanowires in the second layer.

3. An electronically programmable and erasable negative index material crossbar comprising:
   a first layer of approximately parallel nanowires, each nanowire having substantially regularly spaced fingers;
   a second layer of approximately parallel nanowires that overlay the nanowires in the first layer, each nanowire having substantially regularly spaced fingers, wherein the nanowires in the first layer are approximately perpendicular in orientation to the nanowires in the second layer; and
   resonant elements at nanowire intersections, each resonant element including two fingers of a nanowire in the first layer, two fingers of a nanowire in the second layer, and an intermediate layer sandwiched between the nanowire in the first layer and the nanowire in the second layer, wherein a refractive index of a first one of the resonant elements is to be controlled by a change in charge density within the intermediate layer, wherein the intermediate layer further comprises:
      a first dielectric insulation layer disposed adjacent to a nanowire in the first layer of nanowires;
      a second dielectric insulation layer disposed adjacent to a nanowire in the second layer of nanowires and having a relatively larger thickness than the first dielectric insulation layer; and
      a floating gate sandwiched between the first dielectric insulation layer and the second dielectric insulation layer.

4. The crossbar of claim 3 wherein the change in the charge density within the intermediate layer is caused by:
   a voltage applied to the intermediate layer;
   electrons tunneling through the first dielectric insulation layer into a conduction band of the floating gate; and
   electrons trapped in the floating gate.

5. The crossbar of claim 3 wherein the floating gate further comprises at least one of:
   poly-silicon;
   an element semiconductor; and
   a compound semiconductor.

6. The crossbar of claim 3 wherein the intermediate layer further comprises a second semiconductor layer sandwiched between the second dielectric insulation layer and a nanowire in the second layer of nanowires.

7. The crossbar of claim 6 wherein the change in the charge density within the intermediate layer is caused by:
   a voltage applied to the intermediate layer;
   electrons tunnel through the first dielectric insulation layer into a conduction band of the floating gate;
   electrons trapped in the floating gate; and
   charge carriers redistributed in the second semiconductor layer.

8. The crossbar of claim 6 wherein the floating gate and the second semiconductor layer further comprise at least one of:
   poly-silicon;
   an element semiconductor; and
   a compound semiconductor.

9. A dynamically reconfigurable hologram comprising:
   a phase-control layer comprising a two-dimensional array of phase-modulation pixels, the phase-control layer comprising a negative index material crossbar comprising:
      a first layer of approximately parallel nanowires, each nanowire having substantially regularly spaced fingers;
      a second layer of approximately parallel nanowires that overlay the nanowires in the first layer, each nanowire having substantially regularly spaced fingers, wherein the nanowires in the first layer are approximately perpendicular in orientation to the nanowires in the second layer; and
      resonant elements at nanowire intersections, each resonant element including two fingers of a nanowire in the first layer, two fingers of a nanowire in the second layer, and an intermediate layer sandwiched between the nanowire in the first layer and the nanowire in the second layer, wherein a refractive index of a first one of the resonant elements is to be controlled by a change in charge density within the intermediate layer; and
   an intensity-control layer including a two-dimensional array of intensity-control pixels, wherein one or more three-dimensional motion pictures are to be produced by electronically addressing the individual phase-modulation pixels and intensity-control pixels in order to phase shift and control an intensity of light emanating from the pixels of the hologram.

10. The hologram of claim 9 wherein the phase-modulation pixel further comprises an array of one or more resonant elements.

11. The hologram of claim 9 wherein electronically addressing the phase-modulation pixels further comprises selectively applying voltages to respective ones of the phase-modulation pixels, each of the voltages changing the refractive index of a respective one of the phase-modulation pixels.

12. The hologram of claim 11 wherein changing the refractive index of the respective ones of the phase-modulation pixels further comprises changing the charge density of an intermediate layer within a resonant element comprising the respective one of the phase-modulation pixels.

13. The hologram of claim 9 wherein electronically addressing the intensity-control pixels further comprises applying voltages to respective ones of the intensity-control pixels, each voltage changing a transparency of the corresponding intensity-control pixels.

14. The hologram of claim 9 wherein a three-dimensional image is to be produced by transmitting light through a hologram-producing system from a light source located opposite the three-dimensional image or reflecting light from the hologram from a light source located on a same side of the hologram as one or more images produced by the hologram, wherein the light source further comprises a quasimonochromatic light source.

15. A system for generating a three-dimensional image comprising:
   a computer including a processor and memory;
   a dynamically reconfigurable hologram coupled to the computer, the dynamically reconfigurable hologram comprising:
      a first layer of approximately parallel nanowires, each nanowire having substantially regularly spaced fingers;
      a second layer of approximately parallel nanowires that overlay the nanowires in the first layer, each nanowire having substantially regularly spaced fingers, wherein the nanowires in the first layer are approximately perpendicular in orientation to the nanowires in the second layer; and
      resonant elements at nanowire intersections, each resonant element including two fingers of a nanowire in the first layer, two fingers of a nanowire in the second layer, and an intermediate layer sandwiched between the nanowire in the first layer and the nanowire in the second layer, wherein a refractive index of a first one of the resonant elements is to be controlled by a change in charge density within the intermediate layer; and
   a light source positioned to emit quasimonochromatic light into the hologram, wherein data representing one of more images is stored in the memory and the processor is to execute a computer program to display the image data as one or more three-dimensional images by selectively electronically addressing at least some phase-modulation pixels and at least some intensity-control pixels to phase shift and control the intensity of light emanating from the hologram.

16. An apparatus comprising:
   first nanowires, each of the first nanowires having protuberances along a length thereof;
   second nanowires arranged approximately perpendicular to the first nanowires, the protuberances of the first nanowires being approximately parallel to corresponding ones of the second nanowires; and
   a layer disposed between the first and second nanowires, the layer to control refractive indices at nanowire intersections at intersecting ones of the first and second nanowires.

17. The apparatus of claim 16 wherein the layer is to control refractive indices at the nanowire intersections in response to changes in charge density applied thereto.

18. The apparatus of claim 16 wherein the nanowire intersections form resonant elements, each resonant element including two protuberances of a respective one of the first nanowires and two second protuberances of a respective one of the second nanowires.

19. The apparatus of claim 16 wherein the layer further comprises:
   a first dielectric insulation layer disposed adjacent to one of the first nanowires;
   a second dielectric insulation layer disposed adjacent to one of the second nanowires and having a relatively larger thickness than the first dielectric insulation layer; and
   a floating gate disposed between the first dielectric insulation layer and the second dielectric insulation layer.

20. The apparatus of claim 16 further comprising a two-dimensional array of phase-modulation pixels formed by the first nanowires, the second nanowires, and the layer, the phase-modulation pixels being selectively addressable to generate one or more three-dimensional images of a dynamically reconfigurable hologram.

* * * * *